United States Patent
Takahashi et al.

(10) Patent No.: US 6,329,734 B1
(45) Date of Patent: Dec. 11, 2001

(54) PERMANENT MAGNET AND RELUCTANCE TYPE ROTATING MACHINE

(75) Inventors: Norio Takahashi, Yokohama; Kazuto Sakai; Yutaka Hashiba, both of Yokosuka; Masanori Arata, Yokohama; Hirotsugu Tsutsui, Mie-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/510,675

(22) Filed: Feb. 22, 2000

(30) Foreign Application Priority Data

Feb. 22, 1999 (JP) ................................................. 11-043869
Apr. 28, 1999 (JP) ................................................. 11-122000

(51) Int. Cl.[7] .................................................. H02K 21/00
(52) U.S. Cl. ............................... 310/156.56; 310/156.07; 310/156.39; 310/156.57; 310/261; 310/162
(58) Field of Search ................................... 310/156, 261, 310/162; 318/701

(56) References Cited

U.S. PATENT DOCUMENTS

| | | | | |
|---|---|---|---|---|
| 5,510,662 | * | 4/1996 | Tanimoto et al. | 310/156 |
| 5,731,647 | * | 3/1998 | Schueller et al. | 310/114 |
| 5,808,392 | | 9/1998 | Sakai et al. | 310/214 |
| 6,025,667 | * | 2/2000 | Narita et al. | 310/156 |
| 6,087,751 | * | 7/2000 | Sakai | 310/156 |

OTHER PUBLICATIONS

T.J.E. Miller, et al., IEEE Transactions on Industry Application, vol. 27, No. 4, pp. 741–749, "Design of a Synchronous Reluctance Motor Drive," Jul./Aug. 1991.

L. Xu, et al., IEEE Industry Applications Society Annual Meeting, pp. 3–8, "A New Design Concept of Permanent Magnet Machine for Flux Weakening Operation," 1993.

D.A. Staton, et al., IEE Conference Electrical Machines and Drives, pp. 156–160, "Optimisation of the Synchronous Reluctance Motor Geometry," 1991.

* cited by examiner

Primary Examiner—Burton S. Mullins
(74) Attorney, Agent, or Firm—Oblon, Spivak, McClelland, Maier & Neustadt, P.C.

(57) ABSTRACT

A permanent magnet-reluctance type rotating machine includes an annular stator having armature windings arranged on an inner periphery of the stator, a rotor rotatably arranged inside the stator and a plurality of permanent magnets disposed in a rotor core. One permanent magnet defining each pole is divided into two magnet pieces in a direction parallel to the magnetizing direction of the permanent magnets. Owing to the division of the magnet, the mass of each permanent magnet becomes small in comparison with that of the conventional machine, so that the centrifugal force applied on the magnet holes can be reduced. Consequently, the stress generating in the rotor core is decreased to allow the rotating machine to rotate at a higher speed.

26 Claims, 15 Drawing Sheets

PERMANENT MAGNET AND RELUCTANCE TYPE ROTATING MACHINE

BACKGROUND OF THE INVENTION

1. Field of the Invention

The present invention relates to a permanent magnet and reluctance type rotating machine.

2. Description of the Related Art

FIG. 1 shows the schematic structure of a permanent magnet and reluctance type rotating machine (not prior art).

In FIG. 1, the permanent magnet and reluctance type rotating machine 101 comprises a stator 103 carried by a housing or the like and a rotor 105 rotatably arranged in the stator 103. The stator 103 consists of a stator core 107 and armature windings 109 wound around the stator core 107. In the rotor 105, four pairs of permanent magnets 113 are arranged crosswise in a rotor core 111. Magnetic poles 115 are defined by respective core portions in which the magnetic permanents 113 are arranged, while interpoles 119 are constituted by non-magnetic portions 117 between the permanent magnets 113.

FIG. 2 shows magnetic flux φ d due to the armature current, flowing along the directions of respective pole axes of the rotor core 111. In this state, since the magnetic paths are constituted by the core portion forming the poles 115, the flux is easy to flow because of an extremely small magnetic reluctance.

FIG. 3 shows another magnetic flux φ e due to the armature current, flowing along the directions of respective radial axes passing through respective circumferential centers of the interpoles 119. Although the magnetic flux φ e of the interpoles 119 does build the magnetic paths crossing the permanent magnets 113 interposing the interpoles 119, the flux due to the armature current is decreased under the high reluctance action of the permanent magnets 113 because of their relative permeability of approx. 1.

The permanent magnets 113 on both sides of each interpole 119 are magnetized in the directions substantially perpendicular to the pole axes. Therefore, as shown in FIG. 4, the flux generated from each permanent magnet 113 partially circulates in the following order: one pole of the permanent magnet 113, a magnetic portion 121 in the vicinity of the periphery of the core 111, the pole 115 and the opposite pole of the magnet 113, thereby to form a magnetic circuit φ ma. Further, a part of flux from each permanent magnet 6 also flows into the stator 107 through the gap between the rotor 105 and the stator 107 and subsequently passes through the pole 115 of the rotor 105, the neighboring permanent magnet 6 and the originating permanent magnet 113 in order, thereby to form another magnetic circuit φ mb.

Returning to FIG. 3, the interlinkage flux of the permanent magnets 113 distributes in the opposite direction to the magnetic flux φ e (by the armature current) flowing along the center axes of the interpoles 119 to repel the magnetic flux φ e into their mutual negation. At the gap in the vicinity of each interpole 119, there is a reduction in gap flux density derived from the armature current due to the flux of the permanent magnets 113. Consequently, there is produced a great change in the gap flux density between the vicinity of each pole and that of each interpole. In other words, the change of gap flux density with respect to the rotational position of the rotor 105 becomes so large that the change of magnetic energy is increased. Further, under the loaded situation, the rotor 105 is subjected to great magnetic saturation by load currents owing to the presence of the magnetic portions 121 each forming a magnetic short circuit on the boundary between the pole 115 and the interpole 119. The magnetic flux of the magnets 113 distributed in the interpoles 119 is increased. Consequently, there is produced a great unevenness in the distribution of gap flux density by both magnetic reluctance and flux of the permanent magnets 113 and therefore, the magnetic energy is remarkably changed to produce a great output.

Next, we describe the adjusting range of terminal voltage in order to accomplish the operation of the rotating machine at a wide range of variable speeds. Since the permanent magnets 113 exist in only a part of each interpole 119, the rotating machine has a narrow surface area of the permanent magnets 113 in comparison with that of the general rotating machine where the permanent magnets are arranged in the whole circumference of the rotor, also exhibiting a small interlinkage flux due to the permanent magnets 113.

Furthermore, under condition that the machine is unexcited, a considerable quantity of the permanent magnets' flux flows the magnetic portions 121 to become the leakage flux in the rotor core 111. Accordingly, since it is possible to reduce an induced voltage remarkably in this condition, the core loss at the machine's unexciting is reduced. Additionally, when the windings 109 malfunction in a short circuit, the over-current is reduced.

When the rotating machine is loaded, the terminal voltage is induced owing to the addition of interlinkage flux by the armature current (i.e. both exciting current and torque current of the reluctance rotating machine) into the interlinkage flux by the permanent magnets 113.

In the general permanent magnet type rotating machine, it is impossible to adjust the terminal voltage since a great deal of terminal voltage is occupied with the interlinkage flux of the permanent magnets 113. While, in the permanent magnet-reluctance type rotating machine 101, it is possible to adjust the terminal voltage in a wide range by controlling the component of exciting current because of small interlinkage flux of the permanent magnets 113. In other words, as the component of exciting current can be adjusted so as to attain the terminal voltage less than a voltage of the power source voltage corresponding to the velocity, the rotating machine is capable of driving at a wide range of variable speeds (from its base speed) to by a constant voltage.

Furthermore, as the voltage is not restricted by field-weakening under the forced control, there is no possibility of the occurrence of over-voltage even if the control is not effected at the time of the machine's rotating at high speed.

Additionally, since a part of flux from each permanent magnet 113, that is, flux φ ma leaks out into the short circuit of the magnetic portion 121, it is possible to reduce the diamagnetic field in the permanent magnets 113. Thus, since the permanent magnet's operational point is raised on its demagnetizing curve representing the B(magnetic flux density)—H(field intensity) characteristics, that is, the permeance coefficient becomes large, the demagnetizing-proof characteristics against temperature and armature reaction is progressed. Additionally, as the permanent magnets 113 are embedded in the rotor core 111, it will be expected that the rotating machine has a merit to prevent the permanent magnets 113 from scattering due to the rotation of the rotor 105.

On the contrary, since respective core portions around holes 123 for the permanent magnets 113, especially, radial outside portions of the interpoles 119 are formed as thin as possible in view of reducing the flux leakage from the magnets 113, it is unexpectedly difficult to cope with centrifugal force of the permanent magnets 113 in the above-mentioned rotating machine. Particularly, in case of the application for a high-speed rotating machine, there may be caused various problems of the scattering of the permanent magnets 113, the breakage of the rotor 105, etc.

SUMMARY OF THE INVENTION

It is therefore an object of the present invention to provide a permanent magnet-reluctance type rotating machine which is capable of high-speed rotation and high cooling performance against the rotor core and which can improve the reliability of machine while avoiding both high load and temperature demagnetizing action of the permanent magnets.

According to the first aspect of the invention, the object of the present invention described above can be accomplished by a permanent magnet-reluctance type rotating machine comprising:

an annular stator having armature windings arranged on an inner periphery of the stator;

a rotor rotatably arranged inside the stator, the rotor consisting of a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor;

wherein the pair of permanent magnets defining each pole are respectively divided into a plurality of magnet pieces in a direction parallel to the magnetizing direction of the permanent magnets a plurality of magnet pieces; and the divided magnet pieces are embedded in magnet holes formed in the rotor core.

With the above-mentioned structure, since there can be produced a great unevenness in "gap" flux density between each magnetic pole and each interpole, the magnetic energy varies remarkably so that it is possible to provide the rotating machine with a great power output and stable rotations.

Additionally, since the mass of each permanent magnet becomes small due to the separating arrangement, the centrifugal force applied on the magnet holes is reduced. Consequently, the stress generating in the rotor core is decreased to allow the rotating machine to rotate at a higher speed.

According to the second aspect of the invention, the object of the present invention can be also accomplished by a permanent magnet-reluctance type rotating machine comprising:

an annular stator having armature windings arranged on an inner periphery of the stator;

a rotor rotatably arranged inside the stator, the rotor consisting of a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor;

wherein the pair of permanent magnets defining each pole are respectively divided into a plurality of magnet pieces in a direction perpendicular to the magnetizing direction of the permanent magnets; and the divided magnet pieces are embedded in magnet holes formed in the rotor core.

Also in this aspect, as there can be produced a great unevenness in "gap" flux density between each magnetic pole and each interpole, the magnetic energy varies remarkably so that it is possible to provide the rotating machine with a great power output and stable rotations. Since the mass of each permanent magnet becomes small due to the separation of the magnets in the form different from the first aspect, the centrifugal force applied on the magnet holes is also reduced. Consequently, the stress generating in the rotor core is decreased to allow the rotating machine to rotate at a higher speed.

According to the third aspect of the invention, the non-magnetic portion of each interpole is filled up with non-magnetic material of light-weight and high-compressive strength in the permanent magnet-reluctance type rotating machine of the first or second aspect.

In this case, it is possible to reduce the deformation of the rotor core in the vicinity of the magnet holes, which would be caused by the centrifugal force of the permanent magnets, by the non-magnetic material embedded in the magnet holes. Thus, it is possible to decrease the stress generating in the circumferential area of the non-magnetic portions, allowing the rotating machine to rotate at a higher speed.

According to the fourth aspect of the invention, the rotating machine of the first or second aspect further comprises a pair of end plates each having a plurality of projections, wherein the non-magnetic portions of the interpoles are constituted by cavities and the rotor is interposed, at both axial ends thereof, between the pair of end plates while the projections are being fitted in the cavities.

Also in this case, the deformation of the rotor core in the vicinity of the magnet holes can be reduced owing to the provision of the projections on the end plates. Thus, it is also possible to decrease the stress generating in the circumferential area of the non-magnetic portions, allowing the rotating machine to rotate at a higher speed.

According to the fifth aspect of the invention, the rotating machine of the fourth aspect further comprises a partition plate provided, on both side thereof, with a plurality of projections each having a configuration identical to that of each of the cavities, wherein the partition plate is interposed in the rotor core at an intermediate position in the axial direction of the rotor while the projections of the partition plate are fitted into the cavities.

Also in this case, the deformation of the rotor core in the vicinity of the magnet holes can be reduced owing to the provision of the projections on the end plates and the partition plate. Thus, it is also possible to decrease the stress generating in the circumferential area of the non-magnetic portions, allowing the rotating machine to rotate at a higher speed.

According to the sixth aspect of the invention, the rotating machine of the first or second aspect further comprises:

a pair of end plates between which the rotor core is interposed in the axial direction of the rotor;

a partition plate interposed in the rotor core at an intermediate position in the axial direction of the rotor; and a plurality of reinforcement rods which are arranged so as to penetrate the partition plate and the non-magnetic portion of each interpole in the axial direction of the rotor.

Also in this case, the deformation of the rotor core in the vicinity of the magnet holes can be reduced owing to the provision of the reinforcement rods. Thus, it is also possible to decrease the stress generating in the circumferential area of the non-magnetic portions, allowing the rotating machine to rotate at a higher speed.

According to the seventh aspect of the invention, the rotating machine of the first or second aspect further comprises:

a pair of end plates between which the rotor core is interposed in the axial direction of the rotor;
  a partition plate interposed in the rotor core at an intermediate position in the axial direction of the rotor; and
  a plurality of reinforcement rods which are arranged so as to penetrate the partition plate, the rotor core and the end plates in the axial direction of the rotor.

Also in this case, the deformation of the rotor core in the vicinity of the magnet holes can be reduced owing to the provision of the reinforcement rods. Thus, it is also possible to decrease the stress generating in the circumferential area of the non-magnetic portions, allowing the rotating machine to rotate at a higher speed.

According to the eighth aspect of the invention, each of the reinforcement rods is in the form of a hollow pipe made of light-weight and high-strength material in the rotating machine of the sixth aspect.

In this case, the reinforcement rods can be light-weighted and strengthened, so that it is possible to reduce the stress in the circumferential area of the non-magnetic portions certainly.

According to the ninth aspect of the invention, in the rotating machine of the first or second aspect, the permanent magnets are constituted by bond magnets which can stiffen after a lapse of a regular period since the bond magnets have been charged.

In spite of irregularities in the magnet holes, the permanent magnets can be certainly assembled into the magnet holes while avoiding the concentration of stress due to local contacts.

According to the tenth aspect of the invention, in the rotating machine of the first or second aspect, the non-magnetic portion of each interpole is constituted by a through-cavity which extends in the axial direction of the rotor and into which a coolant medium is to be supplied.

In this case, the cooling performance of the rotor core is improved to realize the high-powered rotating machine. Additionally, it is possible to restrict the rising of temperature of the permanent magnets, preventing the thermal deterioration.

According to the eleventh aspect of the invention, the object of the present invention can be also accomplished by a permanent magnet-reluctance type rotating machine comprising:

an annular stator having armature windings arranged on an inner periphery of the stator;
  a rotor rotatably arranged inside the stator, the rotor consisting of a rotor core; and
  a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor;
  wherein the non-magnetic portion of each interpole is constituted by a cavity in which at least one strut is disposed so as to butt against the cavity's inner wall adjacent to the permanent magnet.

With the above arrangement of the invention, owing to the provision of at least one strut in each non-magnetic portion, the deformation of circumferential core portions outside the non-magnetic portions due to the centrifugal force can be restricted to reduce the stress in the rotor core. Therefore, the rotating machine is capable of rotating at higher speed while improving the reliability.

According to the twelfth aspect of the invention, a plurality of struts are bridged so as to cross each other in the cavity in the rotating machine of the eleventh aspect.

Also in this case, the deformation of circumferential core portions outside the non-magnetic portions can be restricted by the struts crossing each other in each cavity, so that the stress in the rotor core is decreased. Accordingly, the rotating machine is capable of rotating at higher speed while improving the reliability.

According to the thirteenth aspect of the invention, the strut disposed in the non-magnetic portion is configured so as to occupy an area of 5 to 30% of the non-magnetic portion in cross section in the rotating machine of the eleventh aspect.

In this case, the appropriate structure in terms of electricity and strength can be provided for the rotating machine in accordance with the above numerical establishment of the strut in cross section. Accordingly, the rotating machine is capable of rotating at higher speed with the improved reliability.

According to the fourteenth aspect of the invention, in the permanent magnet-reluctance type rotating machine of the eleventh aspect, the cavity is fan-shaped in cross section, consisting of two intersecting straight sides and one arc side and wherein the strut is arranged so that its one end butts against one of the straight sides in a position of 25 to 45% of the whole radial length of the one of the straight sides, from its radial inner end.

In the above case, with the numerical establishment of the position of the strut, the deviation of stress due to the centrifugal force of the permanent magnets is alleviated to enable the rotating machine to rotate at higher speed and also improve the reliability.

According to the fifteenth aspect of the invention, in the permanent magnet-reluctance type rotating machine of the eleventh aspect, the strut is arranged so that its inner end butts against the cavity's inner wall adjacent to the permanent magnet, while the outer end butts against the cavity's circumferential wall.

Under the above condition, in case of the permanent magnets of rare-earth element, the inner and outer ends of the strut are contoured, on the side of a center axis of the interpole in the circumferential direction of the rotor, so that a portion of the outer end has a radius of curvature of 55 to 65% of a portion of the inner end, and the strut is also profiled, on the opposite side of the center axis of the interpole, so that a portion of the inner end has a radius of curvature of 60 to 70% of a portion of the outer end.

Alternatively, in case of the permanent magnets of ferrite, the inner and outer ends of the strut are contoured, on the side of the center axis of the interpole, so that the portion of the outer end has a radius of curvature of 15 to 25% of the portion of the inner end, and the strut is also profiled, on the opposite side of the center axis of the interpole, so that the portion of the inner end has a radius of curvature of 45 to 55% of the portion of the outer end.

With the above establishment in curvature radius of the strut, it is possible to minimize the stress concentrating on the corners of the non-magnetic portions, thereby enabling the rotating machine to rotate at higher speed and also improve the reliability.

According to the sixteenth aspect of the invention, in the permanent magnet-reluctance type rotating machine of the eleventh aspect, the rotor core is formed in a manner that the cross sectional area of a core portion interposed between a center axis of the interpole in the circumferential direction of the rotor and a magnet hole formed in the rotor core for accommodating each permanent magnet therein, is equal to 5 to 20% of the cross sectional area of the magnet hole.

In this case, the rotor has an appropriate configuration allowing the stress in the rotor core to be reduced with no influence on the machine's performance. Therefore, it is possible to realize the suitable structure in terms of electricity and structural strength, thereby enabling the rotating machine to rotate at higher speed and also improve the reliability.

According to the seventeenth aspect of the invention, in the permanent magnet-reluctance type rotating machine of the eleventh aspect, the permanent magnets are accommodated in magnet holes formed in the rotor core under the following conditions:

In case of the permanent magnets of rare-earth element, each of the magnet holes is contoured so that the curvature radius of an outer edge of the magnet hole's inner end on the side of a center axis of the interpole in the circumferential direction of the rotor; the curvature radius of an inner edge of the magnet hole's inner end; and the curvature radius of the magnet hole's outer end on the opposite side of the center axis of the interpole are respectively 55 to 65%; 35 to 45%; and 55 to 65% of the width of the magnet hole in the magnetizing direction;

Alternatively, in case of the permanent magnets of ferrite, the magnet hole is contoured so that the curvature radius of the outer edge of the magnet hole's inner end on the side of the center axis of the interpole; the curvature radius of the inner edge of the magnet hole's inner end; and the curvature radius of the magnet hole's outer end on the opposite side of the center axis of the interpole are respectively 40 to 50%; 20 to 30%; and 55 to 65% of the width of the magnet hole in the magnetizing direction.

In this case, owing to the above establishment of the curvature radius, it is possible to minimize the stress concentrating on the corners of the magnet holes, so that the rotating machine can rotate at higher speed with the improved reliability.

According to the eighteenth aspect of the invention, in the permanent magnet-reluctance type rotating machine of the sixteenth aspect, the permanent magnets are accommodated in the magnet holes while remaining cavities in the magnet holes.

In this case, it is possible to reduce the centrifugal force applied on the additional mass together with the reduction in the total weight of the permanent magnets and the reduced weight of the rotor core. Accordingly, it is possible to reduce the stress produced in the rotor core, so that the high-speed drive of the rotating machine can be accomplished to improve the reliability.

According to the nineteenth aspect of the invention, the object of the present invention can be also accomplished by a permanent magnet-reluctance type rotating machine comprising:

a stator having armature windings;

a rotor having a rotor core, a plurality of permanent magnets accommodated in magnet holes formed in the rotor core, for negating the armature windings' flux passing between adjoining poles defined in the rotor, and non-magnetic portions defined in the rotor on the outer circumferential side of the permanent magnets, thereby forming a magnetic unevenness in the circumferential direction of the rotor;

wherein each of the permanent magnets and each of the magnet holes are both arched to have U-shaped configurations.

With the U-shaped configurations that the permanent magnets and the magnet holes have, since the centrifugal force applied on the permanent magnets are born by the magnet holes, it is possible to moderate the concentration of stress about the magnet holes and the permanent magnets, whereby that the high-speed drive of the rotating machine can be accomplished to improve the reliability.

According to the twentieth aspect of the invention, the permanent magnets are accommodated in the magnet holes while remaining cavities in the magnet holes in the permanent magnet-reluctance type rotating machine of the nineteenth aspect.

In this case, since the centrifugal force applied on the permanent magnets are born by the magnet holes, it is possible to moderate the concentration of stress about the magnet holes and the permanent magnets. Additionally, with the reduction in the total weight of the permanent magnets, the centrifugal force applied on the mass in addition to the rotor core is so reduced that it is possible to reduce the stress produced in the rotor core. In this view, the high-speed drive of the rotating machine can be accomplished together with the improved reliability.

According to the twenty-first aspect of the invention, in the permanent magnet-reluctance type rotating machine of the eighteenth or twentieth aspect, the cavities are filled up with light-weight and high-strength non-magnetic material.

In this case, since the displacement of the rotor core in the circumference of each magnet hole is born by the light-weight and high-strength non-magnetic material, the stress generating in the rotor core is so reduced that the high-speed drive of the rotating machine can be accomplished to improve the reliability.

According to the twenty-second aspect of the invention, in the permanent magnet-reluctance type rotating machine of the eighteenth or twentieth aspect, the cavities are filled up with bond-type fillers which solidify as time passes.

In this case, it is possible to prevent the permanent magnets from being damaged due to the dropout, cracking, etc. of the magnets after being inserted into the magnet holes. Further, since the bond-type fillers can contact with the inner walls of the magnet holes uniformly, it is possible to avoid the concentration of stress on the corners of the holes. Also in this view, the high-speed drive of the rotating machine can be accomplished to improve the reliability.

According to the twenty-third aspect of the invention, in the permanent magnet-reluctance type rotating machine of the eighteenth or twentieth aspect, the cavities are filled up with fillers made of foaming resin which solidifies as time passes.

In case of the fillers made of foaming resin, the filler's volume swells to fill it with no clearance after the filler's material has been charged into each cavity. Additionally, owing to its easiness in handling, the filling operation can be performed with ease, whereby it is possible to shorten the operation time to handling the fillers. It is possible to prevent the permanent magnets from being damaged due to the dropout, cracking, etc. of the magnets after being inserted into the magnet holes. Furthermore, owing to the softness of the fillers made of forming resin, the fillers can contact with the inner walls of the magnet holes uniformly, it is possible to avoid the concentration of stress on the corners of the holes. Also in this view, the high-speed drive of the rotating machine can be accomplished to improve the reliability.

According to the twenty-fourth aspect of the invention, the permanent magnet-reluctance type rotating machine of the eighteenth or twentieth aspect further comprises a plurality of rods of circular cross sections made of light-weight and high-strength non-magnetic material, wherein the rods are inserted into the cavities, respectively.

In this case, since the displacement and deformation of the rotor core due to the centrifugal force on the permanent magnets are born by the rods, the stress generating in the rotor core is so reduced that the high-speed drive of the rotating machine can be accomplished to improve the reliability.

According to the twenty-fifth aspect of the invention, the permanent magnet-reluctance type rotating machine of the eighteenth or twentieth aspect further comprises a plurality of rods of polygonal cross sections made of light-weight and high-strength non-magnetic material, wherein the rods are inserted into the cavities so as to each contact with each of the cavities through at least three corners of the polygonal rod.

Then, owing to the insertion of the polygonal rods into the cavities, the displacement and deformation of the rotor core due to the centrifugal force of the permanent magnets are bored by the rods each abutting on the inner wall of the cavity at least three points, the stress in the rotor core is so reduced that the high-speed drive of the rotating machine can be accomplished to improve the reliability.

Further, since each rod is shaped to have a polygonal cross section, it is possible to attain the uniform engagement of the rod with the cavity through a plurality of faces defines the cross section of the rod. Also in this view, the high-speed drive of the rotating machine can be accomplished to improve the reliability.

According to the twenty-sixth aspect of the invention, the permanent magnet-reluctance type rotating machine of the twenty-fourth aspect, the rods are in the form of pipes.

Then, owing to the insertion of the circular or polygonal pipes into the cavities, the displacement and deformation of the rotor core due to the centrifugal force of the permanent magnets are bored by the pipes. Further, owing to the hollow structure of the pipes, the rotating machine is weighted lightly to reduce the centrifugal force. From this point of view, the stress in the rotor core is so reduced that the high-speed drive of the rotating machine can be accomplished to improve the reliability.

According to the twenty-seventh aspect of the invention, the permanent magnet-reluctance type rotating machine of the twenty-fourth aspect further comprises a plurality of plates made of non-magnetic and non-conductive material wherein each of the plates is interposed between each of the rods and the permanent magnet.

In this case, since each plate is interposed between the pipe and the permanent magnet, the permanent magnets in assembling the rotor can be prevented from being damaged and furthermore, it is possible to fix the permanent magnets accurately. Thus, the assembling accuracy can be improved remarkably with the improved reliability.

According to the twenty-eighth aspect of the invention, in the permanent magnet-reluctance type rotating machine of the twenty—fourth aspect, each of the plates is interposed between each of the rods and the permanent magnet inadhesively.

In this case, since each plate is interposed between the pipe and the permanent magnet without using any adhesive agent, it is possible to abolish the work to bond the plate on the inner wall defining the cavity. Thus, the time required for assembling the rotor can be shortened thereby to improve the working efficiency remarkably.

According to the twenty-ninth aspect of the invention, in the permanent magnet-reluctance type rotating machine of any one of the sixteenth, seventeenth and the nineteenth aspects, the magnet holes and the permanent magnets accommodated therein are shaped to have tapered configurations.

Then, since the permanent magnets and the magnet holes are also tapered, it is possible to fix the magnets on the inner walls defining the magnet holes with high accuracy, so that the assembling accuracy of the magnets can be improved to progress the reliability.

According to the thirtieth aspect of the invention, in the permanent magnet-reluctance type rotating machine of the twenty-ninth aspect, each of the permanent magnets accommodated in the magnet holes is coated with material in the form of a film.

In this case, since the film-material is arranged between each magnet hole and each permanent magnet, it is protected by the material. Therefore, it is possible to prevent the permanent magnets from being damaged or deteriorated. In this way, the reliability and life-time of the permanent magnets can be improved remarkably.

These and other objects and features of the present invention will become more fully apparent from the following description and appended claims taken in conjunction with the accompany drawing.

DESCRIPTION OF THE PREFERRED EMBODIMENT

Figure 1:
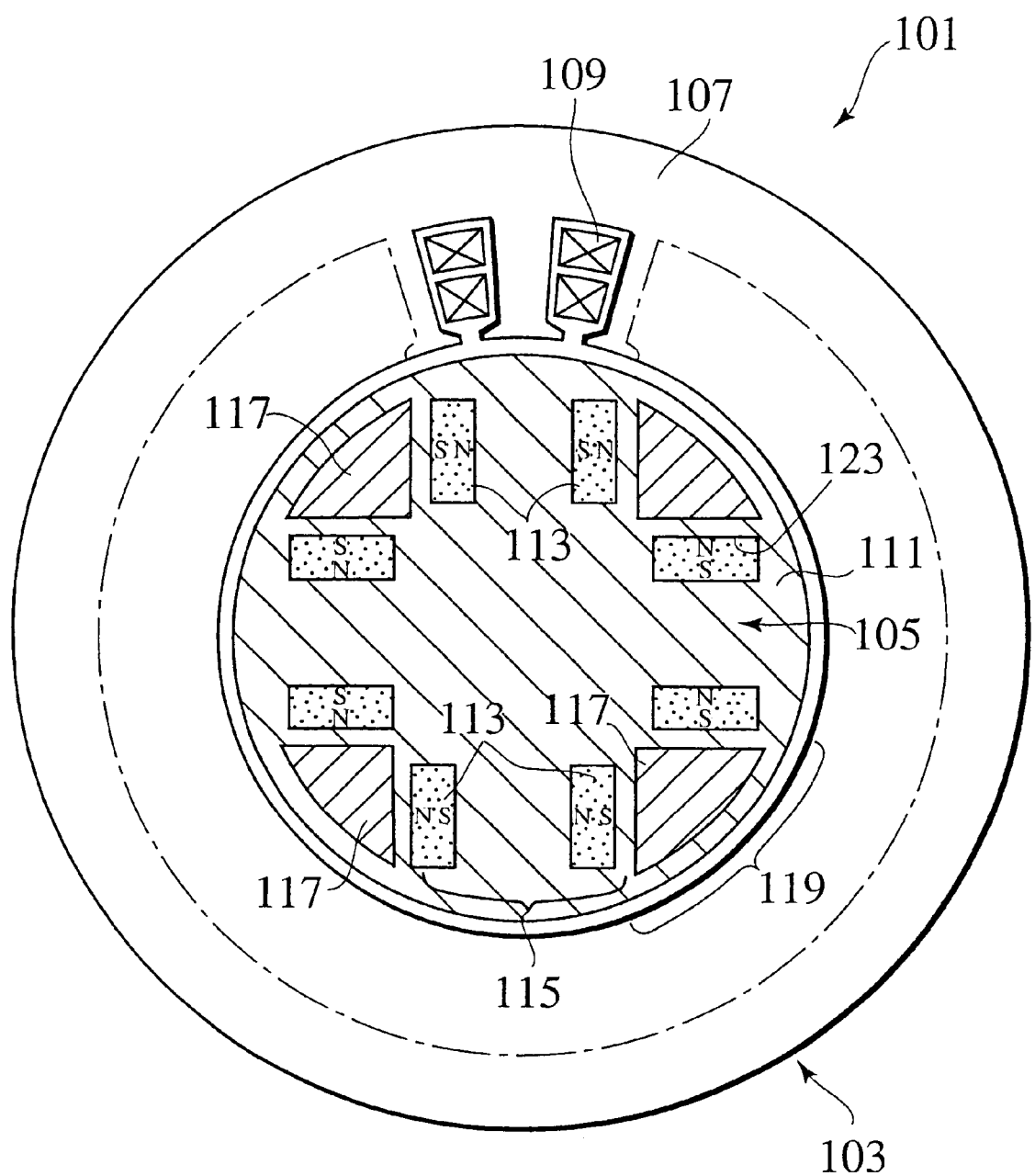
FIG. 1 is a schematic explanatory diagram of a conventional permanent magnet-reluctance type rotating machine.
Figure 2:
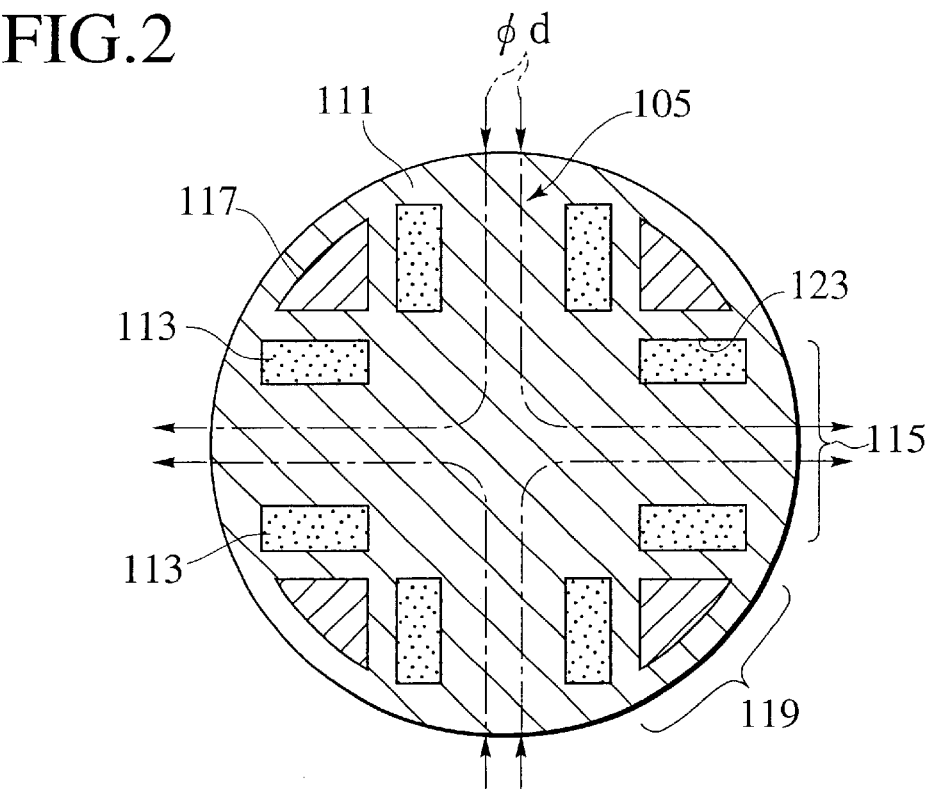
FIG. 2 is an explanatory diagram showing respective flows of magnetic flux in magnetic poles.
Figure 3:
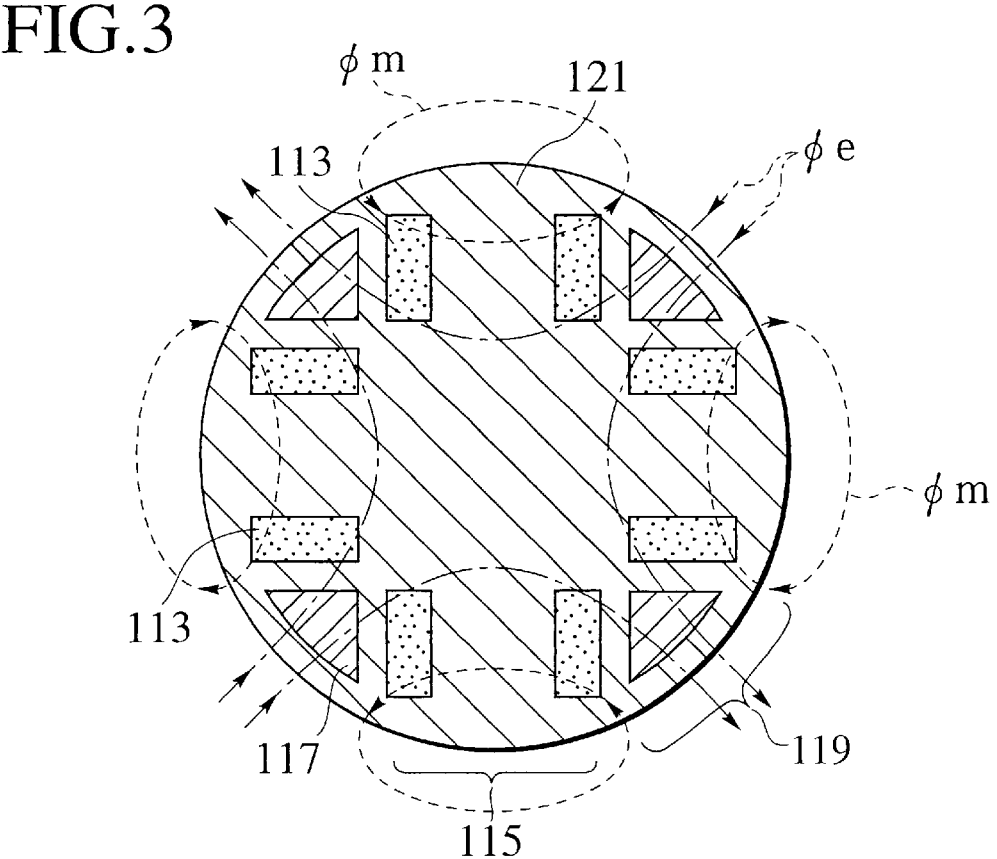
FIG. 3 is an explanatory diagram showing respective flows of magnetic flux in interpoles.
Figure 4:
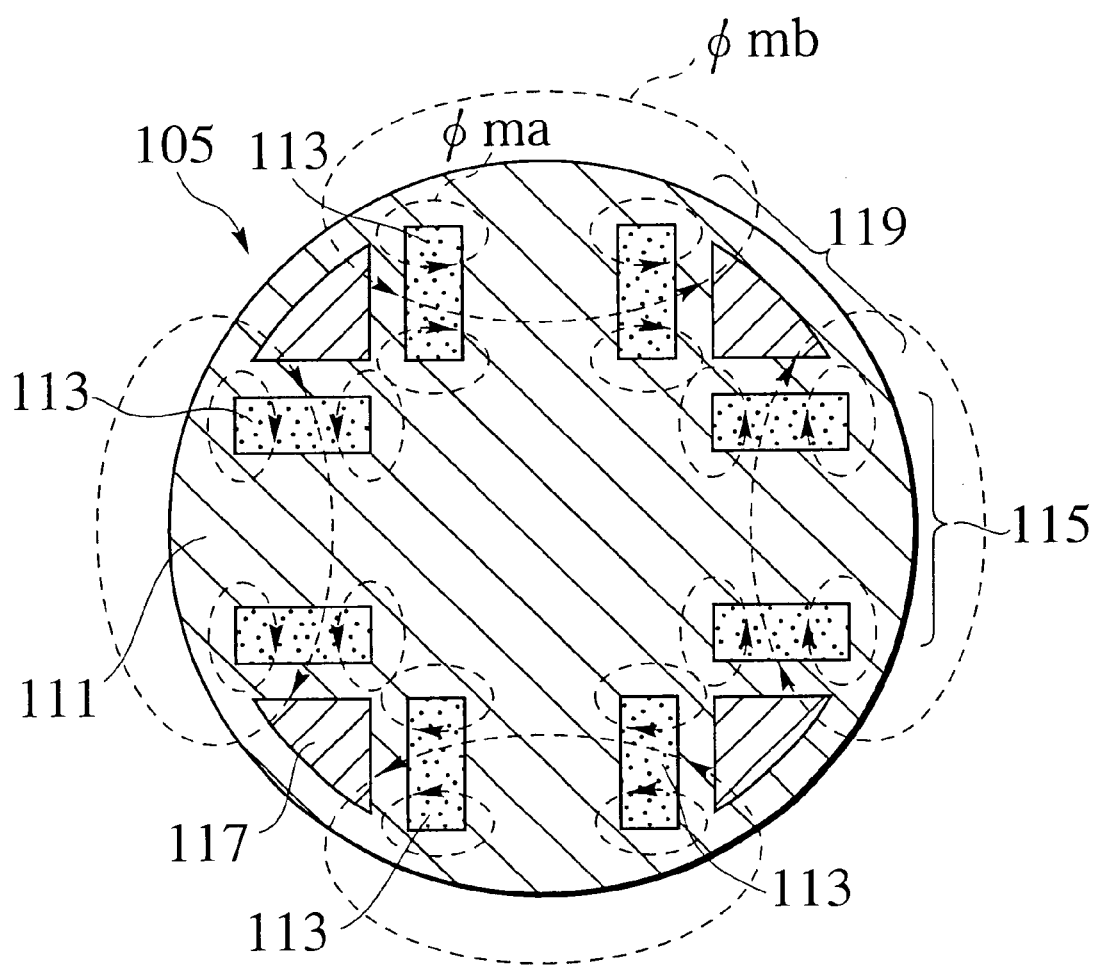
FIG. 4 is an explanatory diagram showing respective flows of magnetic flux in core portions containing permanent magnets.

A number of embodiments of the present invention will be described with reference to the drawings. Note, similar elements through the embodiments are indicated with the same reference numerals, respectively.

1st. Embodiment

Figure 5:
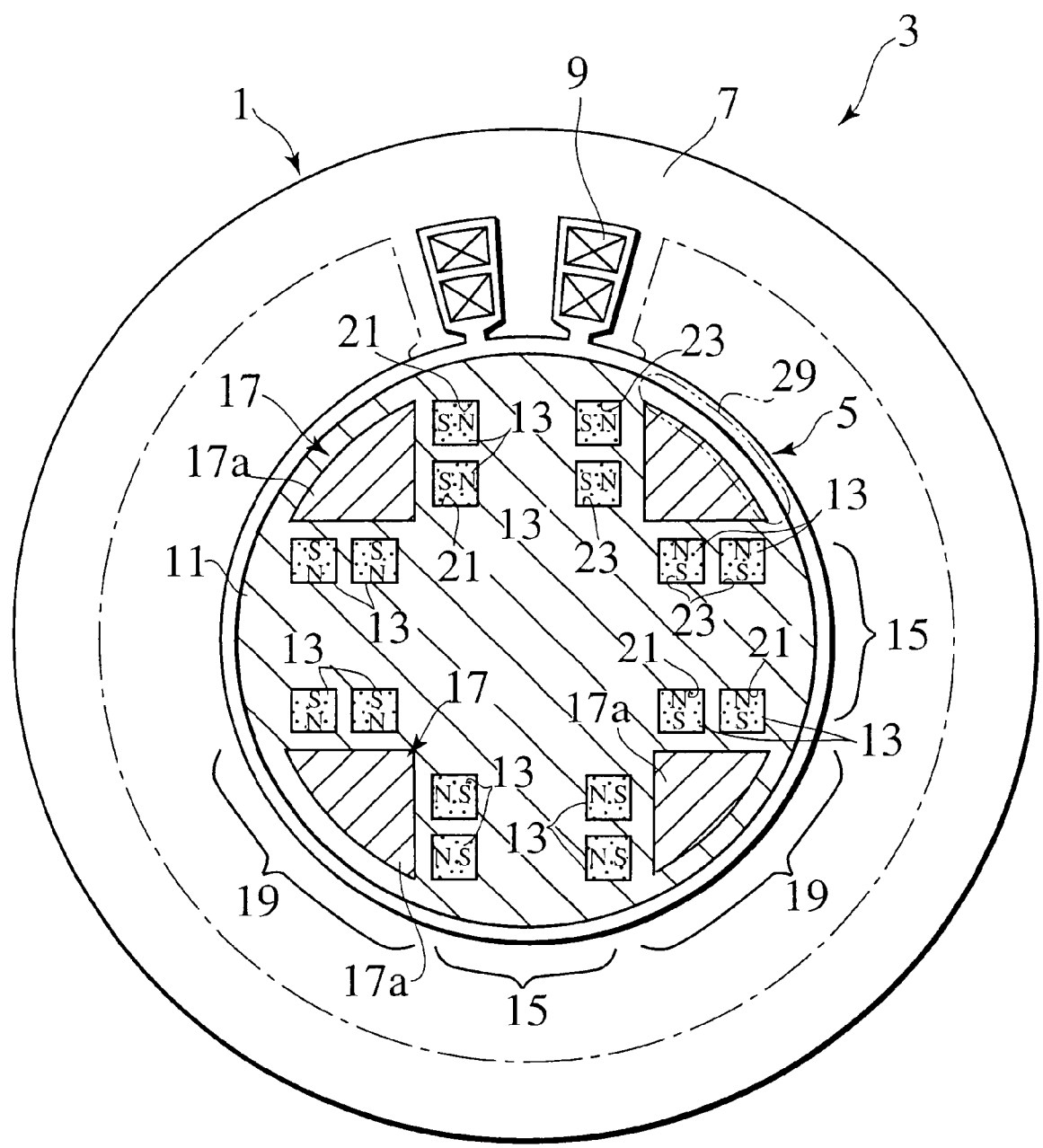
FIG. 5 is a schematic explanatory view of a permanent magnet-reluctance type rotating machine in accordance with the first embodiment of the present invention.
Figure 6:
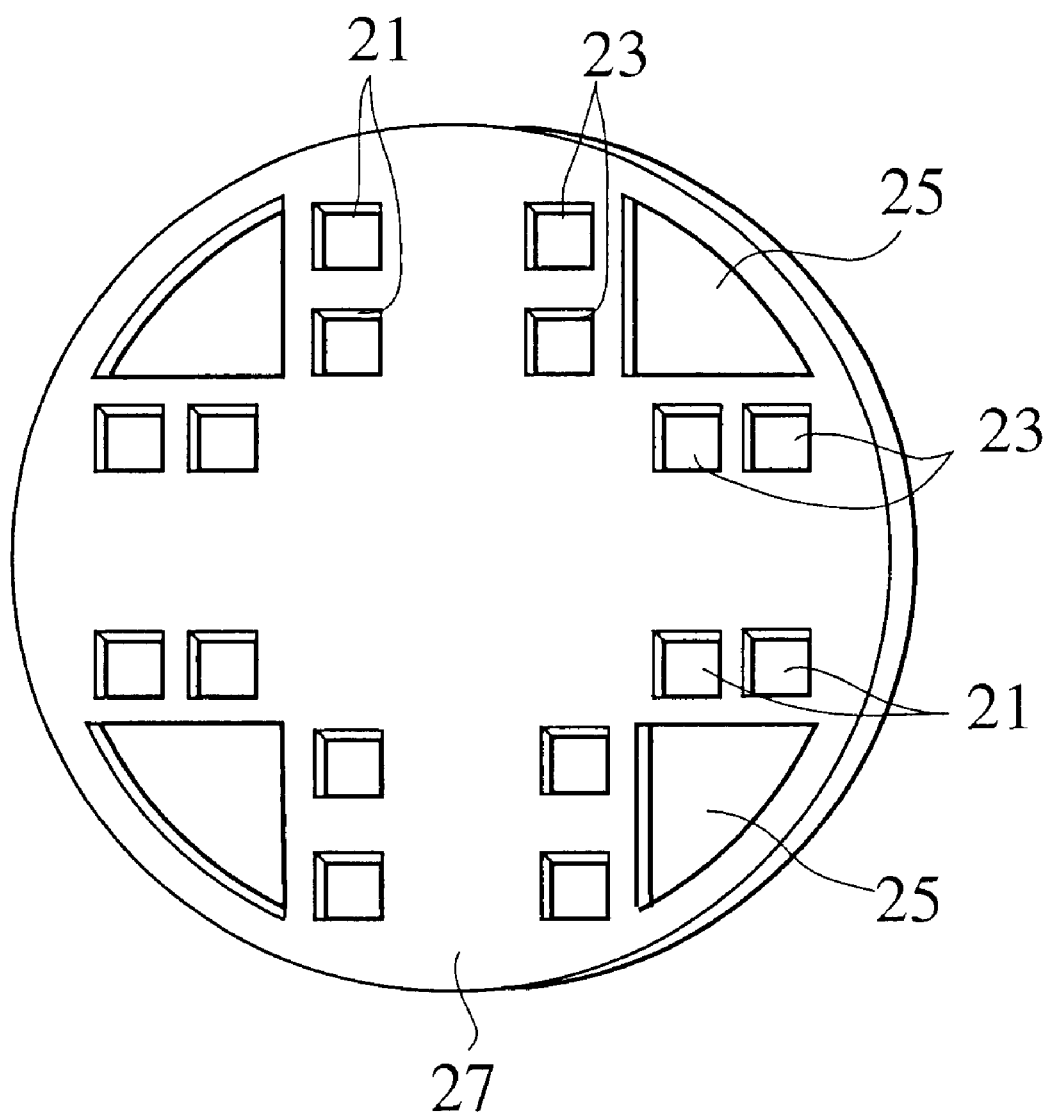
FIG. 6 is a perspective view of a punched plate constituting a rotor core.

We now describe the first embodiment of the invention with reference to FIGS. 5 and 6. In FIG. 5, reference numeral 1 designates a stator 1 of the permanent magnet and reluctance type rotating machine 3, and 5 designates a rotor rotatably arranged in the stator 1.

The stator 1 is supported by a housing case (not shown) or the like and includes a stator core 7 equipped with armature windings 9.

The rotor 5 is provided, in a rotor core 11, with permanent magnets 13. The rotor 5 includes four magnetic poles 15 arranged in four places of the rotor core 11 and non-magnetic poles 17 each disposed between the adjoining magnetic poles 15, 15. Each non-magnetic pole 17 corresponds to an interpole (portion) 19 representing a magnetic concave area. Two pairs of permanent magnets 13 are allocated in each pole 15.

In the embodiment, the rotor core 11 is constituted by a lamination composed of a number of punch plates. FIG. 6 shows a single punch plate 27 as a constituent of the rotor core 11. The punch plate 27 is provided with magnet holes 21, 23 in which two pairs of permanent magnets 13 are fitted in each pole 15 and fan-shaped openings 25 which constitute the non-magnetic portions 17.

In each pole 15, there are provided two pairs of magnet holes 21, 23 (four holes in total) in parallel with the magnetizing direction.

Each permanent magnet 13 is constituted by a "bond" magnet which can stiffen after a lapse of constant period since the material has been charged into the magnet hole 21, 23. In each pole 15, two pairs of permanent magnets 13 are respectively inserted into the magnet holes 21, 21; 23, 23, as if two permanent magnets were divided into four magnet pieces in parallel with the magnetizing direction.

In the pole 15, another pair of permanent magnets 13 (in the holes 21), which oppose the pair of permanent magnets 13 (in the holes 23), are magnetized so as to absorb the latter magnets 13 in the holes 23, constituting a salient pole magnetically. Preferably, the permanent magnets 13 are magnetized in the generally circumferential direction of the rotor 5. More preferably, the magnets 13 are magnetized so as to be substantially perpendicular to a pole axis.

Embedded in each non-magnetic portion 17 is a non-magnetic material 17a which is lightweight and also exhibits a great compressive strength, for example, aluminum, duralumin, reinforced plastic, etc., thereby forming the interpole 19 as a magnetic concave.

That is, the permanent magnets 13 on both sides of each pole 15 are identical to each other in terms of magnetizing direction. Further, two pairs of magnets 13 on both sides of each interpole 19 are magnetically opposite to each other in the circumferential direction of the rotor 5 (i.e. N to N or S to S).

In the so-constructed rotating machine 3, since there can be produced a great unevenness in "gap" flux density through the poles 15 and the interpoles 19 due to both reluctance and flux of the magnets 13, the magnetic energy varies remarkably thereby to provide the rotating machine 3 with a great output and stable rotation.

According to the embodiment, the rotor 5 of the rotating machine 3 is constructed as if each permanent magnet in the conventional rotor were divided into two small pieces. Therefore, it is possible to reduce mass of magnet per piece in comparison with that of the conventional rotor.

Additionally, owing to the adoption of "bond" magnet that hardens in a short time after filling up, the magnets' hit against the magnet holes 21, 23 can be canceled to avoid the concentration of stress.

Consequently, as the centrifugal force applied on the magnet holes 21, 23 and the stress generating in the rotor core 11 are together reduced to half, the rotating machine is capable of rotating at a higher speed.

Furthermore, since the rigidity and strength in a thin circumferential wall 29 of each interpole 19 can be ensured by the embedded portion 17, it is possible to reduce the stress generating in the rotor core 11 thereby enabling the rotor 5 to rotate at a higher speed.

2nd. Embodiment

Figure 7:
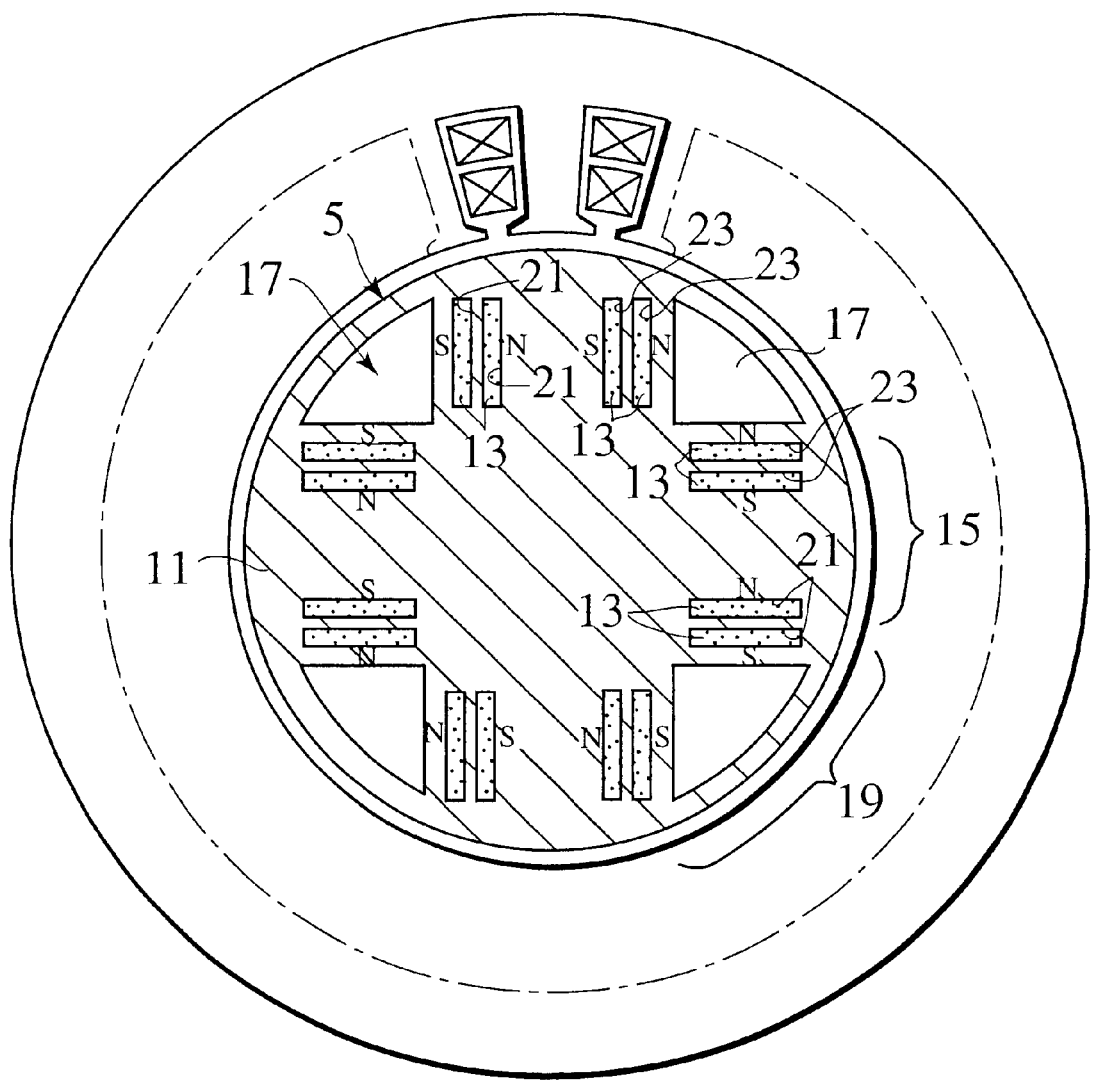
FIG. 7 is a schematic sectional view of a permanent magnet-reluctance type rotating machine in accordance with the second embodiment of the present invention.

FIG. 7 shows the permanent magnet-reluctance type rotating machine in accordance with the second embodiment of the present invention.

In this embodiment, two permanent magnets 13 on both sides of each pole 15 are respectively divided into four magnet pieces in a direction perpendicular to the magnetizing direction and respectively embedded in the rotor core 11. The non-magnetic portions 17 forming the interpoles 19 are constructed to be cavities into which gaseous coolant, such as hydrogen gas, is supplied. Alternatively, the above gaseous coolant may be cooling air from the outside.

The other constituents of the rotating machine are identical to those of the first embodiment, respectively and therefore, the overlapping descriptions are eliminated.

According to the second embodiment, the rotor 5 of the rotating machine 3 is constructed as if each permanent magnet on each side of the pole in the conventional rotor were divided into two magnet pieces. Therefore, it is possible to reduce mass of magnet per piece in comparison with that of the conventional rotor.

Consequently, as the centrifugal force acting on the magnet holes 21, 23 and the stress generating in the rotor core 11 are together reduced to half, the rotating machine is capable of rotating at a higher speed.

Additionally, owing to the flow of coolant gas through the nonmagnetic portions 17, the cooling capability of the rotor core 11 can be improved to prevent the permanent magnets 13 from being deteriorated in thermal and also realize the stable performance of the machine in a long term.

3rd. Embodiment

Figure 8:
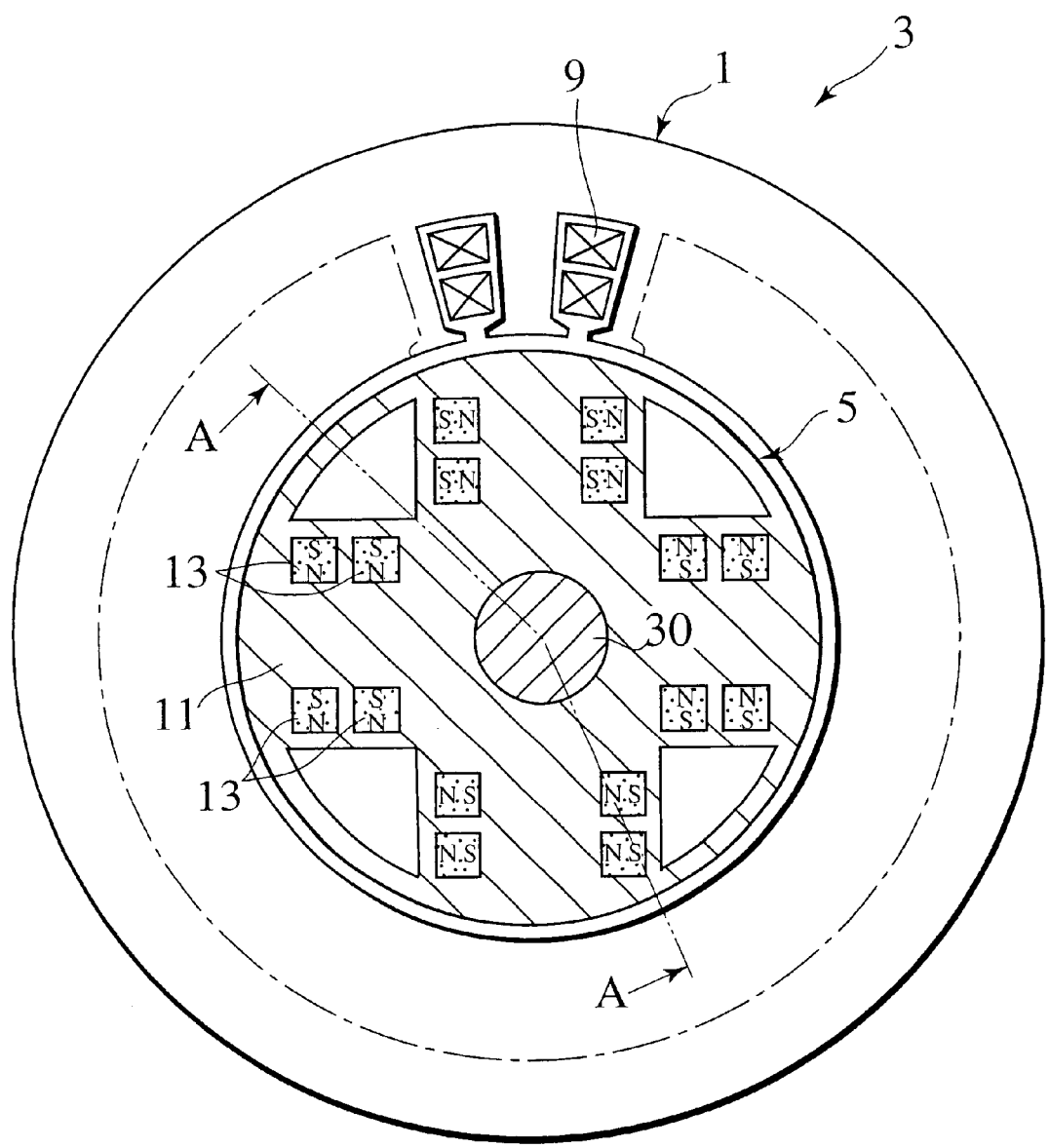
FIG. 8 is a schematic sectional view of a permanent magnet-reluctance type rotating machine in accordance with the third embodiment of the present invention.
Figure 9:
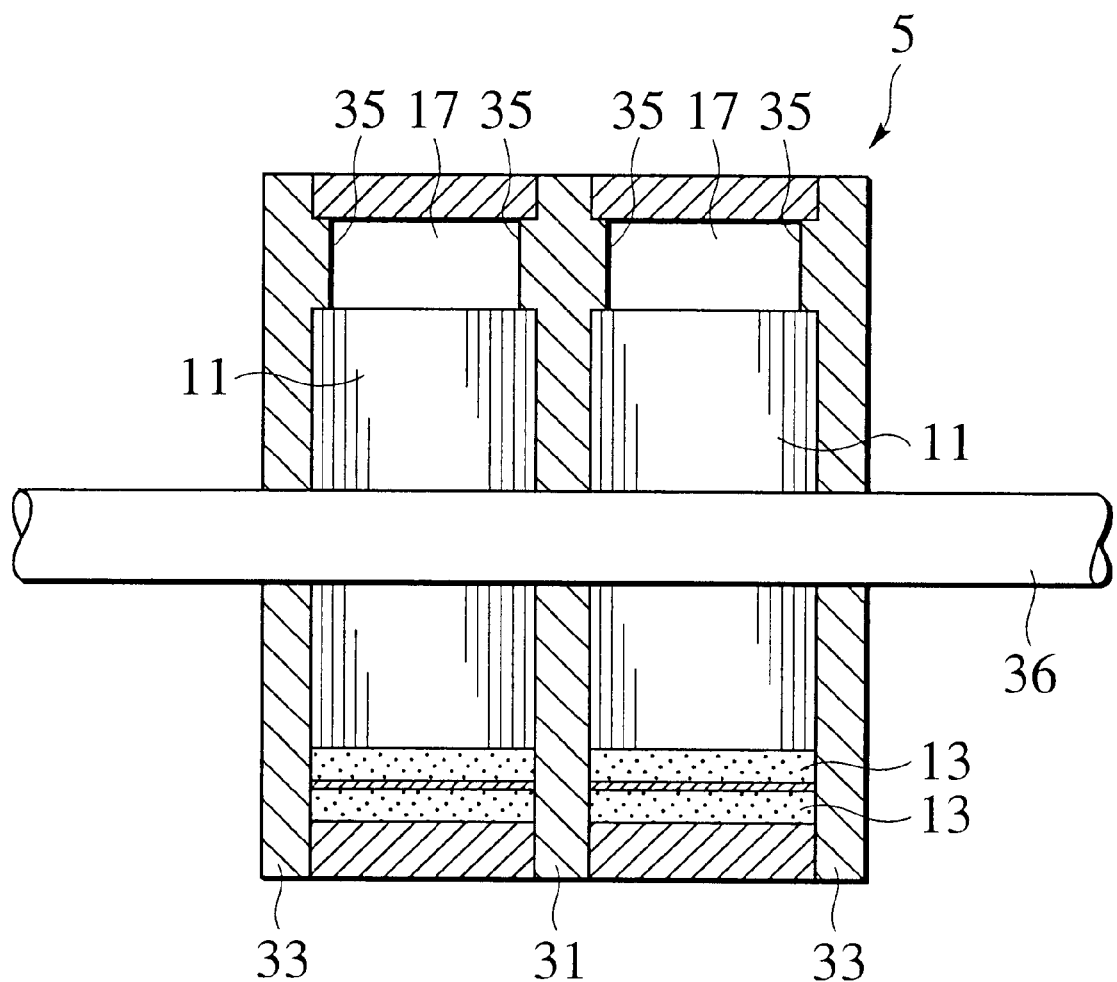
FIG. 9 is a sectional view of the permanent magnet-reluctance type rotating machine of FIG. 8, taken along a line A—A.

FIGS. 8 and 9 show the permanent magnet-reluctance type rotating machine in accordance with the third embodiment of the present invention.

In this embodiment, the non-magnetic portion 17 forming each interpole 19 is constituted by a through-cavity extending in the axial direction of the rotor 5. As shown in FIG. 9, a partition plate 31 is interposed in the rotor core 11, while a pair of end plates 33 are arranged on both axial sides of the rotor core 11. In order to carry the plates 31, 33 and the core 11 in one body, a shaft 36 is arranged so as to penetrate the center of the rotor core 11.

The partition plate 31 is provided, on both sides thereof, with projections 35 each of which has a cross section similar to that of the non-magnetic portion 17. Similarly, each end plate 33 is provided, on one side thereof, with the same projection 35 for engagement with the non-magnetic portion 17.

The other constituents of the rotating machine are identical to those of the first embodiment, respectively and therefore, the overlapping descriptions are eliminated.

According to the third embodiment, since the respective projections 35 on the plates 31, 33 act to withstand the deformation of the rotor core 11 in the circumference of the holes 21, 23 due to the centrifugal force of the magnets 13 in rotation, the stress generating in the rotor core 11 is so decreased that the rotating machine can be driven at a higher speed.

4th. Embodiment

Figure 10:
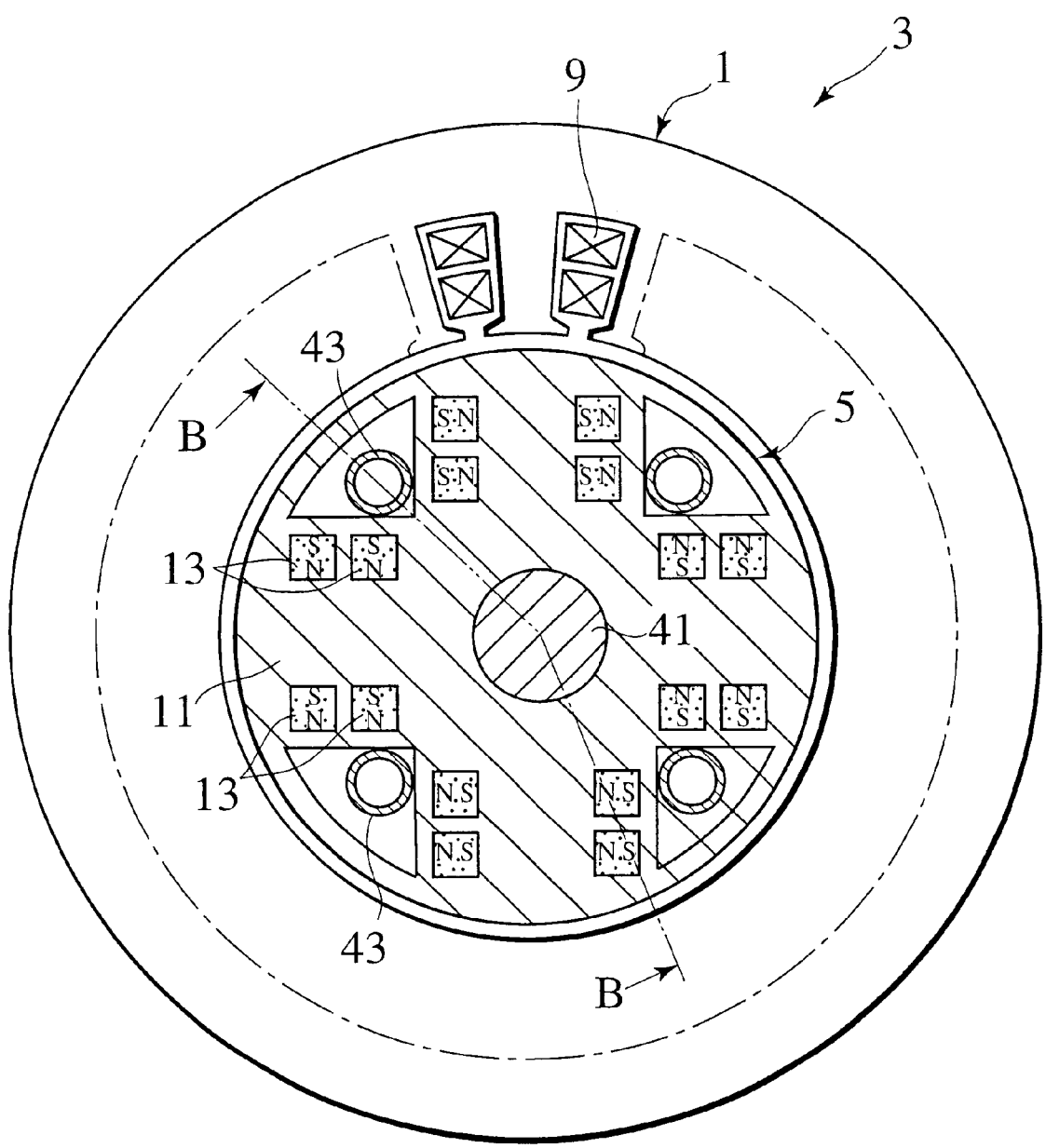
FIG. 10 is a schematic sectional view of a permanent magnet-reluctance type rotating machine in accordance with the fourth embodiment of the present invention.
Figure 11:
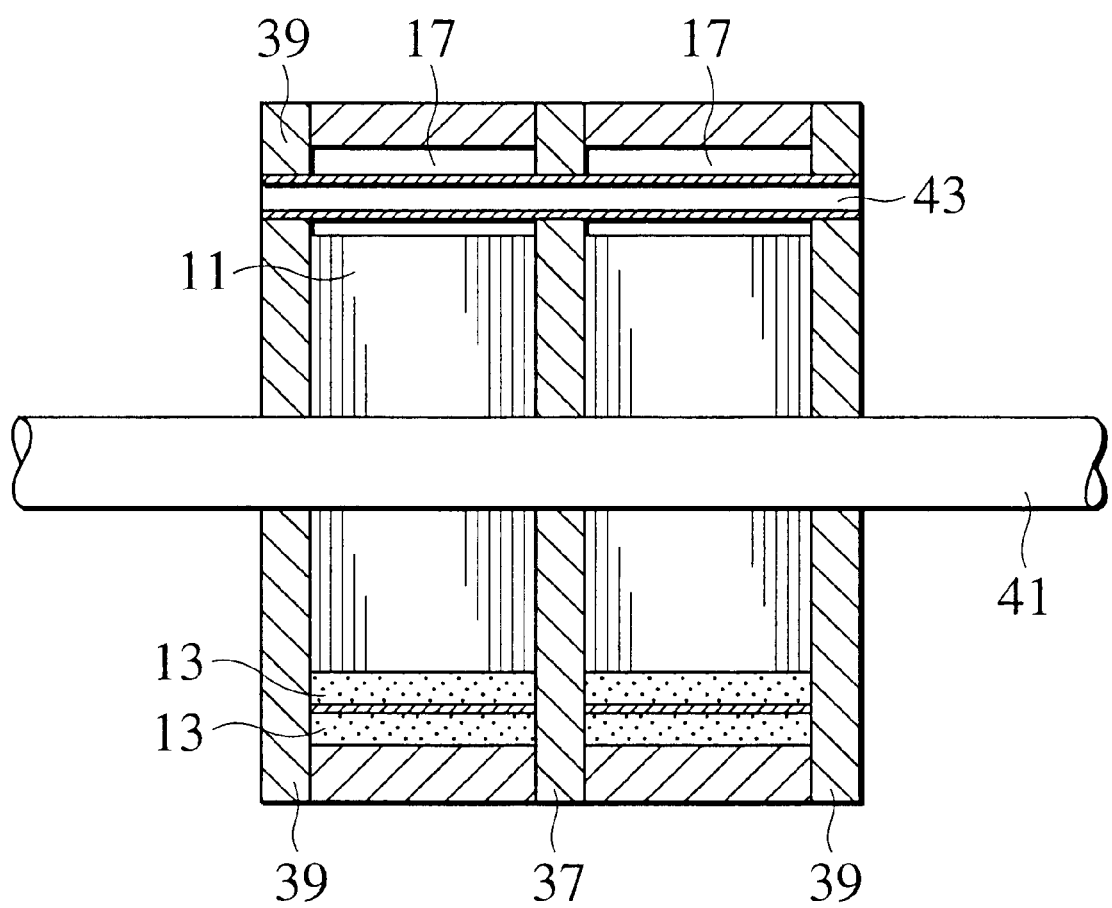
FIG. 11 is a sectional view of the reluctance type rotating machine of FIG. 10, taken along a line B—B.

FIGS. 10 and 11 show the permanent magnet-reluctance type rotating machine 3 in accordance with the fourth embodiment of the present invention.

Also in this embodiment, the non-magnetic portion 17 forming each interpole 19 is constituted by a through-cavity extending in the axial direction of the rotor 5. As shown in FIG. 11, a partition plate 37 is interposed in the rotor core 11, while a pair of end plates 39 are arranged on both axial sides of the rotor core 11. In order to carry the plates 37, 39 and the core 11 in one body, a shaft 41 is arranged so as to penetrate the center of the rotor core 11.

In the non-magnetic portions 17, hollow reinforcement rods 43 made of light-weight and high-strength material, such as titanium, are arranged so as to penetrate the partition plate 37 and the end plates 39.

The other constituents of the rotating machine are identical to those of the first embodiment, respectively and therefore, the overlapping descriptions are eliminated.

According to the fourth embodiment, since the reinforcement rods 43 act to withstand the deformation of the rotor core 11 in the circumference of the holes 21, 23 due to the centrifugal force of the magnets 13 in rotation, the stress generating in the rotor core 11 is so decreased that the rotating machine can be driven at a higher speed.

Alternatively, even when the reinforcement rods 43 are arranged so as to penetrate the rotor core 11 and the partition plate 37 directly, then it is possible to restrict the deformation of the rotor core 11 about the holes 21, 23.

5th. Embodiment

Figure 12:
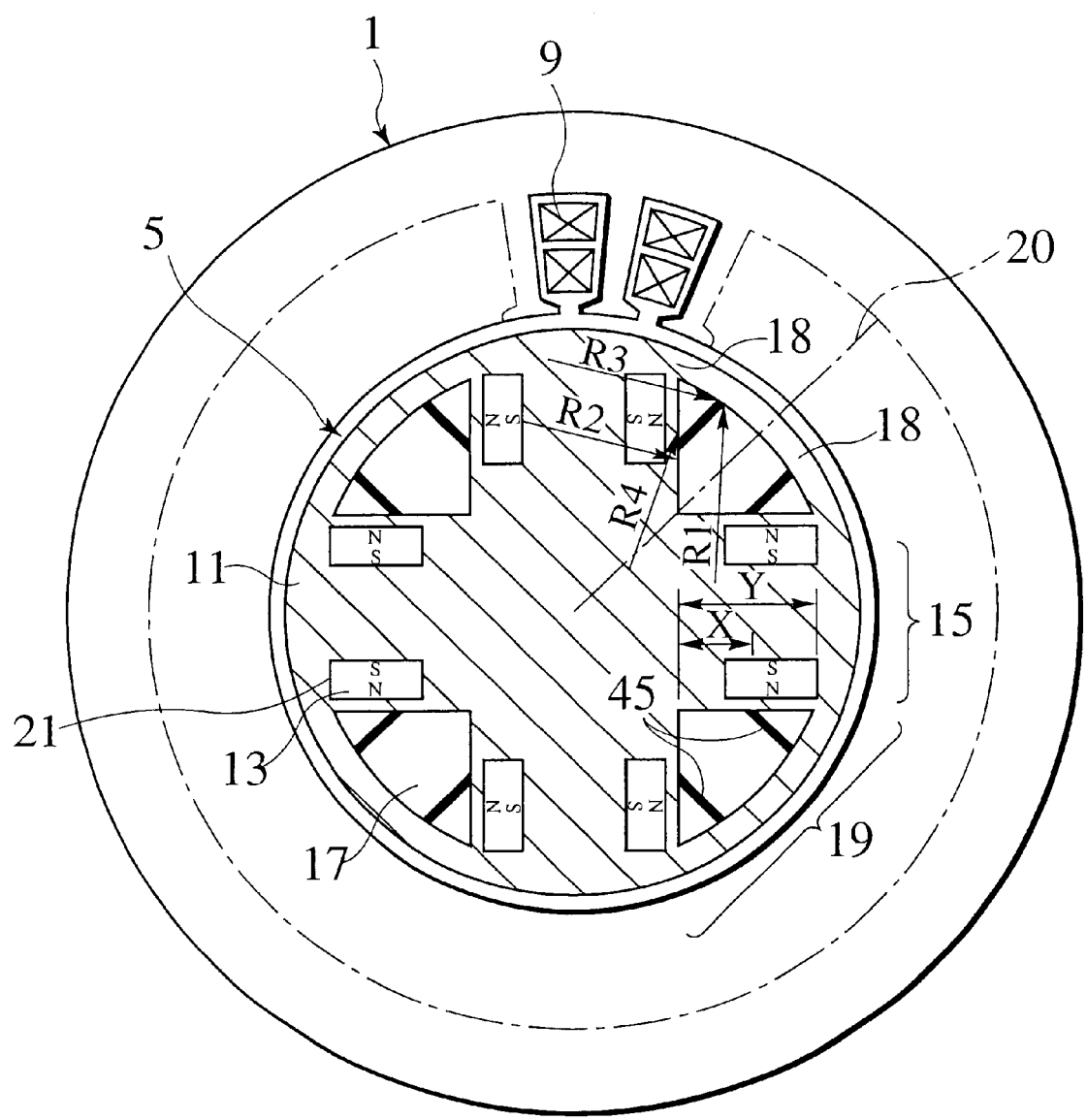
FIG. 12 is a schematic sectional view of a permanent magnet-reluctance type rotating machine in accordance with the fifth embodiment of the present invention.

FIG. 12 shows the permanent magnet-reluctance type rotating machine in accordance with the fifth embodiment of the present invention. In FIG. 12, the annular stator 1 includes the armature windings 9 and the rotor 5 is rotatably accommodated in the stator 1. The rotor 5 includes the rotor core 11 and the permanent magnets 13.

The rotor core 11 is provided to have some directions to facilitate the magnetization of the rotor 5 and other directions to make the magnetization difficult. That is, in order to form a magnetic unevenness about the rotor 5, the rotor core 11 is composed of a plurality of electromagnetic steel plates laminated on each other. The electromagnetic steel plates are provided, in common, with magnet holes 21 for accommodating eight permanent magnets 13 therein. The eight holes 21 are positioned crosswise in the rotor core 11, forming four salient-poles. In the rotor 5, respective core portions each interposed between two parallel magnet holes 21 do define four magnetic projections to be the magnetic poles 15, while other core portions each defined between two magnet holes 21 in the vertical relationship do form four magnetic recesses to be the interpoles 19.

Further, the permanent magnets 13 in the holes 21 are magnetized so as to negate the flux of armature current flowing between the adjacent poles 15 in the circumferential direction of the rotor 5. That is, two permanent magnets 13 on both sides of each pole 15 are identical to each other in terms of the magnetizing direction. While, the magnetizing directions of two permanent magnets 13 on both sides of each interpole 19 are opposite to each other in the circumferential direction of the rotor 5. It is preferable that the permanent magnets 13 are magnetized in the substantially circumferential direction. More preferably, the permanent magnets 13 are magnetized in respective directions substantially perpendicular to the pole axes.

The non-magnetic portion 17 in each interpole 19 is constituted by a cavity. In cross section, the cavity is defined by two intersecting straight sides and one arc side, providing a fan-shaped configuration.

According to the embodiment, each non-magnetic portion 17 of the interpole 19 is provided with two struts 45 which reinforce the circumferential wall defining the interpole 19 in the bridge structure.

In terms of the cross sectional area, each strut 45 in the non-magnetic portion 17 is configured so as to occupy a cross sectional area of 5 to 30% of the whole cross sectional area of the non-magnetic portion 17.

In each cavity, the strut 45 is arranged so that its one end butts against one straight side of the cavity in a position of 25 to 45% of the whole length of the straight side, from the intersecting point of the straight sides, namely, the inner end of the straight side. Note, the strut 45 is also arranged so that the outer end butts against the cavity's circumferential wall (one arc side).

In case of adopting the "rare-earth" permanent magnets 13 for the rotor 5, as shown in FIG. 12, the inner and outer ends of the strut 45 are contoured, on the side of a center axis 20 of the interpole 19 in the circumferential direction of the rotor 5, so that the outer end portion has a radius R1 of curvature equal to 55 to 65% of a radius curvature R2 of the inner end portion. Additionally, the strut 45 is also profiled, on the opposite side of the center axis 20 of the interpole 19, so that the inner end portion has a curvature radius R4 equal to 60 to 70% of the curvature radius R3 of the outer end portion.

Alternatively, in case of adopting the "ferrite" permanent magnets 13, the inner and outer ends of the strut 45 are contoured, on the side of the center axis 20 of the interpole 19, so that the outer end portion has the curvature radius R1 equal to 15 to 25% of the curvature radius R2 of the inner end portion. On the opposite side of the center axis 20 of the interpole 19, the f the inner end portion has the curvature radius R4 equal to 45 to 55% of the same R3 of the outer end portion.

In the above-constructed permanent magnet-reluctance type rotating machine of the embodiment, since the distribution of "gap" flux density changes with great irregularities due to the magnetic reluctance and flux of the permanent magnets, the magnetic energy is changed remarkably so that the machine can rotate with great output and stability.

Additionally, owing to the provision of one or more struts 45 (e.g. two struts) in each non-magnetic portion 17, the deformation of circumferential core portions outside the non-magnetic portions 17 due to the centrifugal force can be restricted to reduce the stress in the rotor core 11. Therefore, the rotating machine is capable of rotating at higher speed while improving the reliability.

Regarding the above ratio of the strut 45 to the non-magnetic portion 17 in cross section, it is preferable that the strut 45 is formed to have a small cross section in order to provide the machine with high outputs. Conversely, it is preferable that the strut 45 is formed to have a large cross section in order to provide the machine with high strength.

From these points of view, since the cross sectional ratio of the strut 45 to the non-magnetic portion 17 is established within an appropriate range (i.e. 5 to 30% ), the rotating machine of the embodiment can be provided with an appropriate structure in terms of electricity and strength. Thus, the rotating machine of the embodiment is capable of rotating at higher speed while improving the reliability.

According to the embodiment, since the position of the strut 45 in each non-magnetic portion 17 is arranged so that its one end butts against one straight side of the cavity in the position X (FIG. 12) of 25 to 45% of the whole length Y of the straight side, the deviation of stress due to the centrifugal force of the permanent magnets 13 is alleviated to enable the rotating machine to rotate at higher speed and also improve the reliability.

Repeatedly, in case of the "rare-earth" permanent magnets 13 for the rotor 5, the inner and outer ends of the strut 45 are contoured, on the side of a center axis 20 of the interpole 19 in the circumferential direction of the rotor 5, so that a portion of the outer end has a radius R1 of curvature equal to 55 to 65% of a curvature radius R2 of a portion of the inner end. Additionally, the strut 45 is also profiled, on the opposite side of the center axis 20 of the interpole 19, so that a portion of the inner end has a radius R4 of curvature equal to 60 to 70% of a curvature radius R3 of a portion of the outer end.

In case of the "ferrite" permanent magnets 13, the inner and outer ends of the strut 45 are contoured, on the side of the center axis 20 of the interpole 19, so that the outer end portion has the curvature radius R1 equal to 15 to 25% of the curvature radius R2 of the inner end portion. On the opposite side of the center axis 20 of the interpole 19, the inner end portion has the curvature radius R4 equal to 45 to 55% of the radius R3 of the outer end portion.

With the above establishment of the respective curvature radii of the strut 45, it is possible to moderate the concentration of stress on respective roots of the strut 45, so that the high-speed drive of the rotating machine can be accomplished to improve the reliability.

6th. Embodiment

Figure 13:
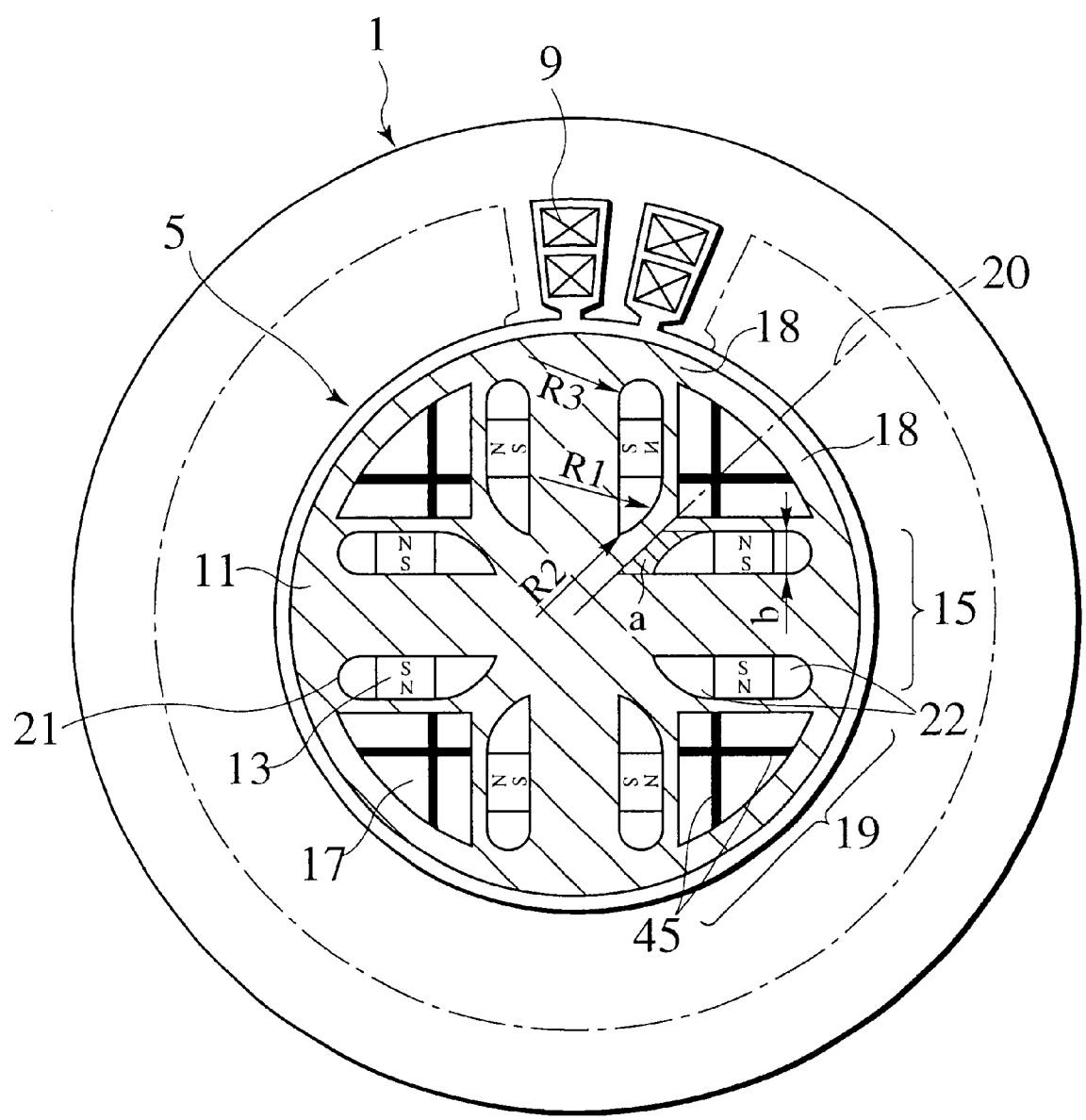
FIG. 13 is a schematic sectional view of a permanent magnet-reluctance type rotating machine in accordance with the sixth embodiment of the present invention.

FIG. 13 shows the permanent magnet-reluctance type rotating machine in accordance with the sixth embodiment of the present invention.

In this embodiment, elements similar to those in the previously-mentioned embodiments are indicated with the same reference numerals, respectively.

According to the sixth embodiment, each non-magnetic portion 17 of the interpole 19 is provided with the plural struts 45 which cross each other and reinforce the circumferential wall defining the interpole 19 in the bridge structure.

Further, the rotor core 11 is formed in a manner that the cross sectional area of a column portion a (FIG. 13), which is interposed between the center axis 20 of the interpole 19 and the magnet hole 21 formed in the rotor core 11, is equal to 5 to 20% of the cross sectional area of the magnet hole 21.

In case of adopting the "rare-earth" permanent magnets 13 for the rotor 5, the magnet hole 21 is contoured, on the side of the center axis 20, so that the curvature radius R1 of an outer edge of the inner end of the hole 21; the curvature radius R2 of an inner edge of the inner end; and the curvature radius R3 of the outer end of the hole 21 are respectively 55 to 65%; 35 to 45%; and 55 to 65% of the width b of the hole 21 in the magnetizing direction.

Alternatively, in case of adopting the "ferrite" permanent magnets 13, it is established that the curvature radius R1 of an outer edge of the inner end of the hole 21; the curvature radius R2 of an inner edge of the inner end; and the curvature radius R3 of the outer end of the hole 21 are respectively 40 to 50%; 20 to 30%; and 55 to 65% of the width b of the hole 21 in the magnetizing direction.

According to the embodiment, the permanent magnet 13 is embedded in each magnet hole 21 while remaining two cavities 22 on both sides of the magnet 13.

Owing to the provision of the plural struts 45 (e.g. two struts) crossing each other in each non-magnetic portion 17, the deformation of circumferential core portions outside the non-magnetic portions 17 due to the centrifugal force can be restricted to reduce the stress in the rotor core 11. Therefore, the rotating machine is capable of rotating at higher speed while improving the reliability.

Regarding the above ratio of the column portion a, against the cross sectional area of the magnet hole 21, it is preferable that the column portion a has a small cross section because the reduction of leakage flux through the column portion a would allow a reduction of the machine's output to be restricted. Conversely, it is also preferable that the column portion a has a large cross section in view of ensuring the strength of the rotor 5.

In spite of such a contradiction, since the cross sectional ratio of the column portion a to the cross sectional area of the magnet hole 21 is established within an appropriate range (i.e. 5 to 20% ), the rotating machine of the embodiment can be provided with an appropriate structure in terms of electricity and strength. Thus, the rotating machine of the embodiment is capable of rotating at higher speed while improving the reliability.

Repeatedly, in case of the "rare-earth" permanent magnets 13 for the rotor 5, the curvature radius RI of the outer edge of the inner end of the hole 21; the curvature radius R2 of the inner edge of the inner end; and the curvature radius R3 of the outer end of the hole 21 are set to 55 to 65%; 35 to 45%; and 55 to 65% of the width b of the hole 21 in the magnetizing direction, respectively. In case of adopting the "ferrite" permanent magnets 13, the curvature radius R1 of the outer edge of the inner end of the hole 21; the curvature radius R2 of the inner edge of the inner end; and the curvature radius R3 of the outer end of the hole 21 are set to 40 to 50%; 20 to 30%; and 55 to 65% of the width b of the hole 21 in the magnetizing direction, respectively.

With the above establishment of the respective curvature radii of the magnet hole 21, it is possible to minimize the stress concentrating on the corners of the hole 21, so that the high-speed drive of the rotating machine can be accomplished to improve the reliability.

Furthermore, owing to the provision of the cavities 22 on both sides of each magnet 13, it is possible to reduce the centrifugal force applied on the additional mass together with the reduction in the total weight of the permanent magnets 13 and the reduced weight of the rotor core 11. Accordingly, it is possible to reduce the stress produced in the rotor core 11, so that the high-speed drive of the rotating machine can be accomplished to improve the reliability.

7th. Embodiment

Figure 14:
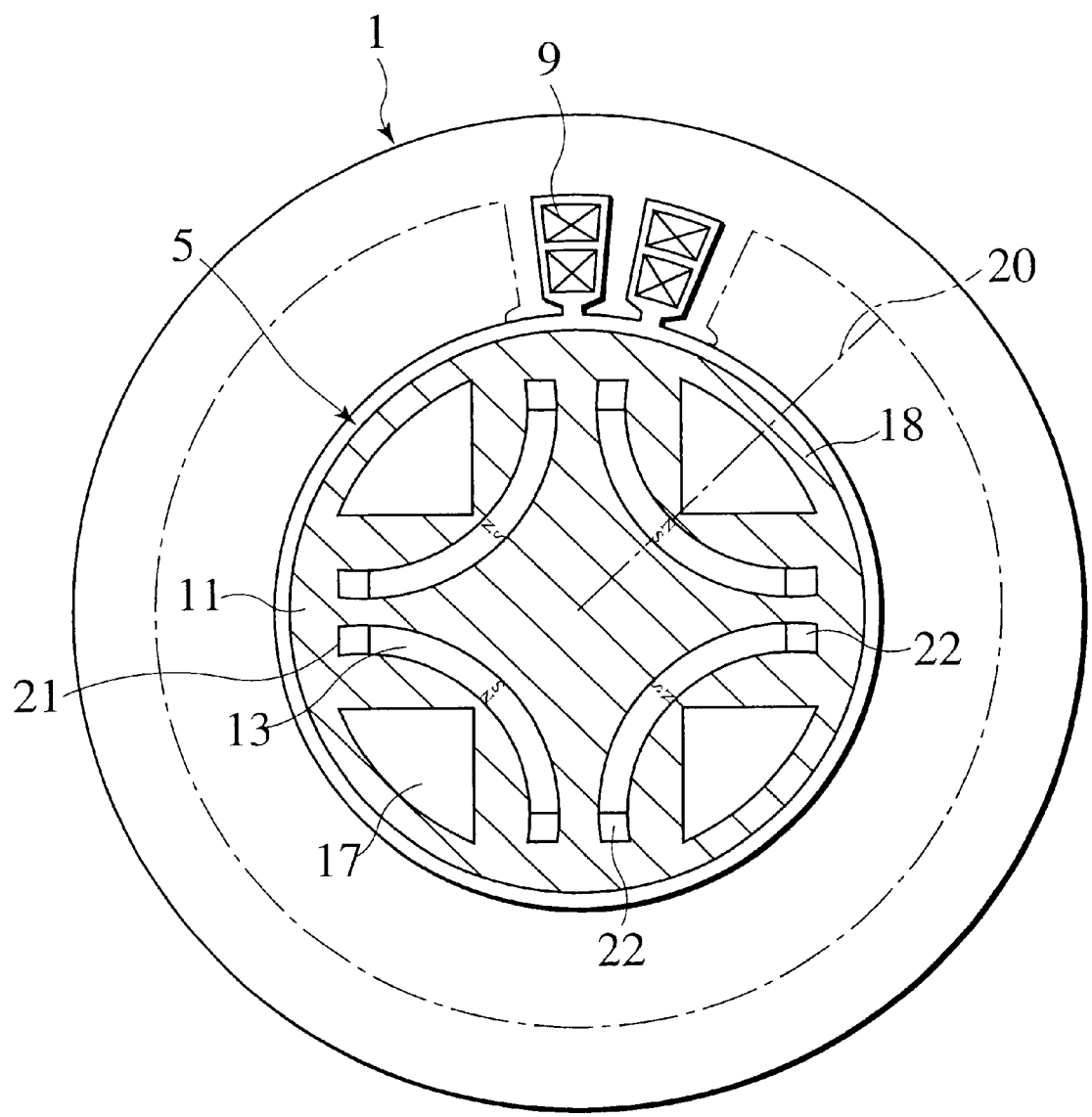
FIG. 14 is a schematic sectional view of a permanent magnet-reluctance type rotating machine in accordance with the seventh embodiment of the present invention.

FIG. 14 shows the permanent magnet-reluctance type rotating machine in accordance with the sixth embodiment of the present invention.

Also in this embodiment, elements similar to those in the previously-mentioned embodiments are indicated with the same reference numerals, respectively.

According to the seventh embodiment, the rotor 5 is provided with four magnet holes 21 in the form of U-shaped arches. Correspondingly, each of the permanent magnets 13 is shaped like a U-shaped arch and embedded in each magnet hole 21 while remaining the cavities 22 on both sides of the magnet 13.

Further, according to the embodiment, the cavities 22 may be filled up with fillers made of light-weight and high-strength non-magnetic material although they are not shown in the figure.

In the modification of the non-magnetic material, they may be replaced with bond-type fillers to be solidified after being filled into the cavities 22. Alternatively, the cavities 22 may be filled up with forming resin to be solidified after being filled into the cavities 22.

According to the embodiment, since the centrifugal force applied on the permanent magnets 13 are born by the arch-shaped magnet holes 21, it is possible to moderate the concentration of stress about the holes 21 and the magnets 13, whereby that the high-speed drive of the rotating machine can be accomplished to improve the reliability.

Further, since the centrifugal force applied on each permanent magnet 13 can be bored by an arch-shaped inner wall defining the magnet hole 21 owing to the formation of the cavities 22 on both sides of each magnet 13, it is possible to moderate the concentration of stress about the holes 21 and the magnets 13.

Furthermore, owing to the provision of the cavities 22 on both sides of each magnet 13, it is possible to reduce the centrifugal force applied on the additional mass together with the reduction in the total weight of the permanent magnets 13 and the reduced weight of the rotor core 11. Accordingly, it is possible to reduce the stress produced in the rotor core 11, so that the high-speed drive of the rotating machine can be accomplished to improve the reliability.

In case of the fillers made of non-magnetic, non-conductive, light-weight and high-strength material embedded in the cavities 22, the deformation about the magnet holes 21 due to the centrifugal force applied on the magnets 13 can be supported by the fillers, so that it is possible to lo reduce the stress generating in the rotor core 11. In this view, the high-speed drive of the rotating machine can be accomplished to improve the reliability.

In case of the bond-type fillers, it is possible to prevent the permanent magnets 13 from being damaged due to the dropout, cracking, etc. of the magnets 13 after being inserted into the magnet holes 21. Further, since the bond-type fillers can contact with the inner walls of the magnet holes 13 uniformly, it is possible to avoid the concentration of stress on the corners of the holes 13. Also in this view, the high-speed drive of the rotating machine can be accomplished to improve the reliability.

In case of the fillers made of forming resin, the filler's volume swells to fill it with no clearance after the filler's material has been charged into each cavity 22. Owing to its easiness in handling, the filling operation can be performed with ease, whereby it is possible to shorten the operation time to handling the fillers. Additionally, it is possible to prevent the permanent magnets 13 from being damaged due to the dropout, cracking, etc. of the magnets 13 after being inserted into the magnet holes 21. Furthermore, owing to the softness of the fillers made of form resin, the fillers can contact with the inner walls of the magnet holes 13 uniformly, it is possible to avoid the concentration of stress on the corners of the holes 13. Also in this view, the high-speed drive of the rotating machine can be accomplished to improve the reliability.

8th. Embodiment

Figure 15:
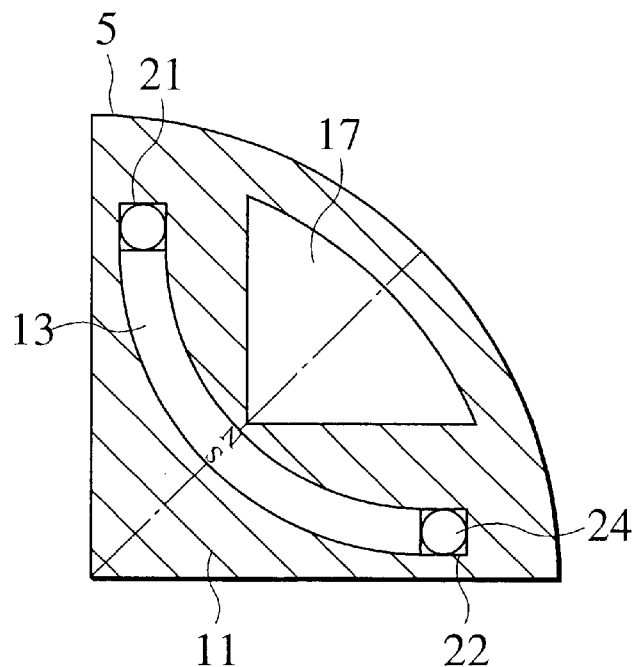
FIG. 15 is a quarter sectional view of a rotor of a permanent magnet-reluctance type rotating machine in accordance with the eighth embodiment of the present invention.

FIG. 15 shows a quarter of the permanent magnet-reluctance type rotating machine in accordance with the eighth embodiment of the present invention.

Also in this embodiment, elements similar to those in the seventh embodiment are indicated with the same reference numerals, respectively.

Similarly to the seventh embodiment, the rotor core 11 is provided with four magnet holes 21 (only one shown) in the form of U-shaped arches. Correspondingly, each of the permanent magnets 13 is shaped like a U-shaped arch and embedded in each magnet hole 21 while remaining the cavities 22 on both sides of the magnet 13.

Further, according to the embodiment, circular sectional rods 24 made of light-weight and high-strength non-magnetic material are inserted into the cavities 22.

Owing to the insertion of the rods 24 into the cavities 22, the displacement and deformation of the rotor core 11 due to the centrifugal force of the permanent magnets 13 are bored by the rods 24, the stress in the rotor core 11 is so reduced that the high-speed drive of the rotating machine can be accomplished to improve the reliability.

Further, since each rod 24 is shaped to have a circular cross section, it is possible to attain the uniform engagement of the rod 24 with the cavity 22 with no deviated contacts. Also in this view, the high-speed drive of the rotating machine can be accomplished to improve the reliability.

9th. Embodiment

Figure 16:
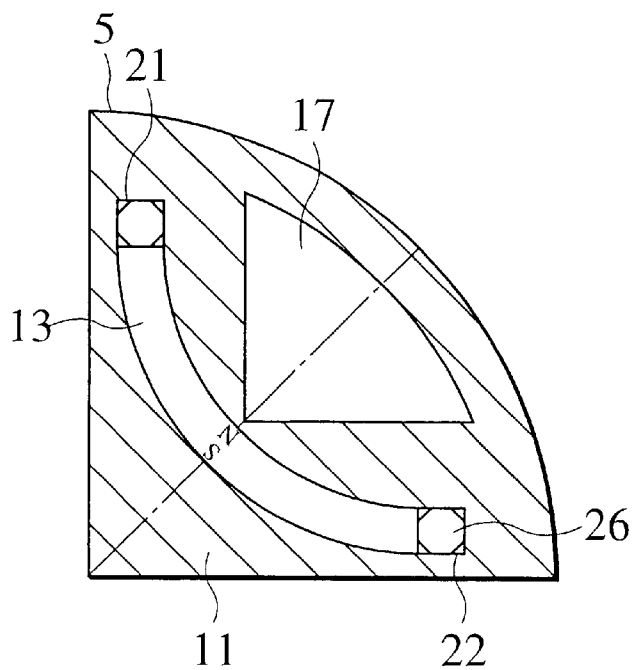
FIG. 16 is a quarter sectional view of a rotor of a permanent magnet-reluctance type rotating machine in accordance with the ninth embodiment of the present invention.

FIG. 16 shows a quarter of the permanent magnet-reluctance type rotating machine in accordance with the ninth embodiment of the present invention.

Also in this embodiment, elements similar to those in the eighth embodiment are indicated with the same reference numerals, respectively.

Similarly to the eighth embodiment, the rotor core 11 is provided with four magnet holes 21 in the form of U-shaped arches. Correspondingly, each of the permanent magnets 13 is shaped like a U-shaped arch and embedded in each magnet hole 21 while remaining the cavities 22 on both sides of the magnet 13.

According to the embodiment, a polygonal-shaped rod 26 made of light-weight and high-strength non-magnetic material is inserted into each cavity 22 with at least three contacts of the rod 26 on the inner wall of the cavity 22.

Owing to the insertion of the polygonal rods 26 into the cavities 22, the displacement and deformation of the rotor core 11 due to the centrifugal force of the permanent magnets 13 are bored by the rods 26 each abutting on the inner wall of the cavity 22 at least three points, the stress in the rotor core 11 is so reduced that the high-speed drive of the rotating machine can be accomplished to improve the reliability.

Further, since each rod 26 is shaped to have a polygonal cross section, it is possible to attain the uniform engagement of the rod 26 with the cavity 22 through a plurality of faces defines the cross section of the rod 26. Also in this view, the high-speed drive of the rotating machine can be accomplished to improve the reliability.

10th. Embodiment

Figure 17:
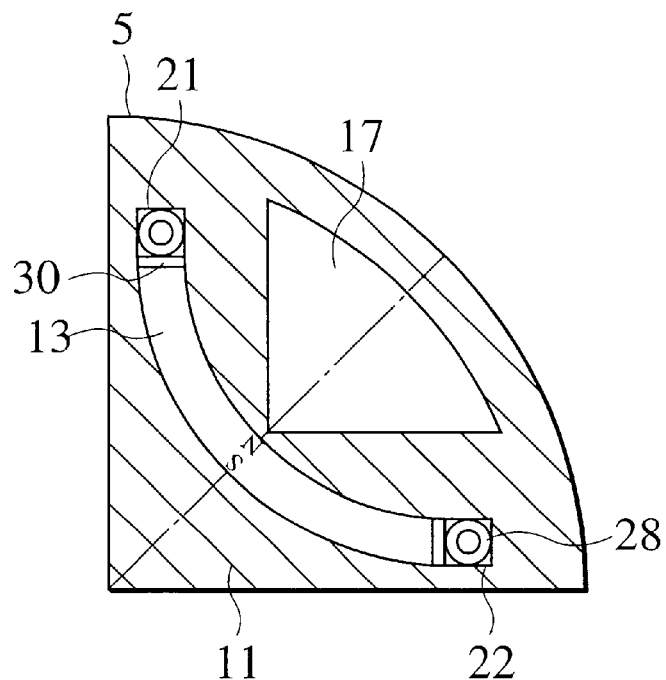
FIG. 17 is a quarter sectional view of a rotor of a permanent magnet-reluctance type rotating machine in accordance with the tenth embodiment of the present invention.

FIG. 17 shows a quarter of the permanent magnet-reluctance type rotating machine in accordance with the tenth embodiment of the present invention.

Also in this embodiment, elements similar to those in the ninth embodiment are indicated with the same reference numerals, respectively.

Similarly to the ninth embodiment, the rotor core 11 is provided with four magnet holes 21 in the form of U-shaped arches. Correspondingly, each of the permanent magnets 13 is shaped like a U-shaped arch and embedded in each magnet hole 21 while remaining the cavities 22 on both sides of the magnet 13.

According to the embodiment, an annular or polygonal pipe 28 is inserted into each cavity 22 while interposing a non-magnetic and non-conductive plate 30 between the pipe 28 and the permanent magnet 13 with no adhesive agent. Note, in the modification, the pipe 28 may be replaced with a rod having a circular or polygonal cross section as shown in FIGS. 15 and 16.

Owing to the insertion of the circular or polygonal pipes (or rods) 28 into the cavities 22, the displacement and deformation of the rotor core 11 due to the centrifugal force of the permanent magnets 13 are bored by the pipes 28. Further, owing to the hollow structure of the pipes 28, the rotating machine is weighted lightly to reduce the centrifugal force. Consequently, the stress in the rotor core 11 is so reduced that the high-speed drive of the rotating machine can be accomplished to improve the reliability.

Additionally, since the plate 30 is interposed between the pipe 28 and the permanent magnet 13 without using the adhesive agent, it is possible to abolish the work to bond the plate 30 on the inner wall defining the cavity 22. Thus, the time required for assembling the rotor 5 could be shortened thereby to improve the working efficiency remarkably.

11th. Embodiment

Figure 18:
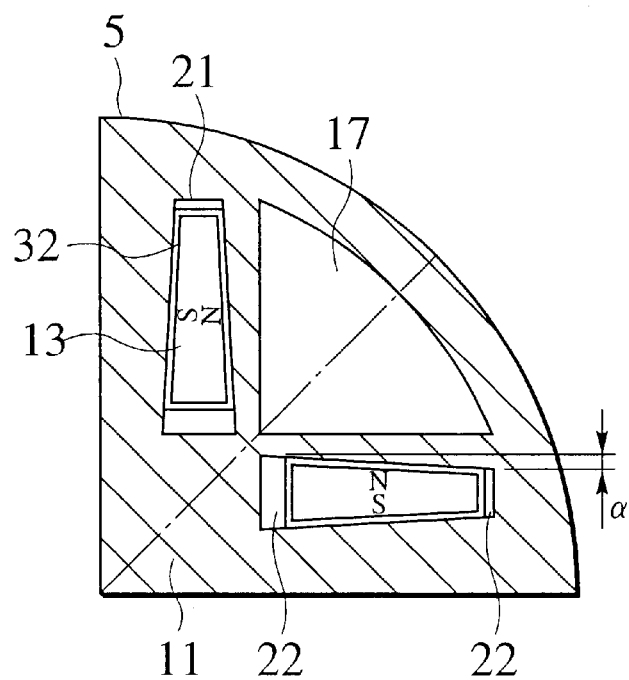
FIG. 18 is a quarter sectional view of a rotor of a permanent magnet-reluctance type rotating machine in accordance with the eleventh embodiment of the present invention.

FIG. 18 shows a quarter of the permanent magnet-reluctance type rotating machine in accordance with the eleventh embodiment of the present invention.

Also in this embodiment, elements similar to those in the tenth embodiment are indicated with the same reference numerals, respectively.

According to the embodiment, the rotor core 11 is provided, on both sides of each non-magnetic portion 17, with two tapered magnet holes 21 and two tapered permanent magnets 13 to be accommodated in the holes 21.

In each magnet hole 21, the permanent magnet 13 is covered with a film material 32.

Owing to their tapered configurations, the permanent magnets 13 can be fitted in the magnet holes 21 tightly, so that it is possible to improve the electric characteristics of the rotating machine.

Moreover, since the centrifugal force applied on each permanent magnet 13 is bored by opposing tapered surfaces defining the magnet hole 21, it is possible to almost remove the concentration of stress produced about the hole 21 and also reduce the stress in the rotor core 11. Therefore, the high-speed drive of the rotating machine can be accomplished to improve the reliability.

Additionally, since the permanent magnets 13 and the magnet holes 21 are also tapered, it is possible to fix the magnets 13 on the inner walls defining the magnet holes 21 with high accuracy, so that the assembling accuracy of the magnets 13 can be improved to progress the reliability.

Since the film material 32 is arranged between each magnet hole 21 and the permanent magnet 13, it is protected by the material 32. Therefore, it is possible to prevent each permanent magnet 13 from being damaged or deteriorated, thereby improving the reliability and life-time of the permanent magnets 13.

Finally, it will be understood by those skilled in the art that the foregoing descriptions are preferred embodiments of the rotating machine, and that various changes and modifications may be made to the present invention without departing from the spirit and scope thereof.

What is claimed is:

1. A permanent magnet-reluctance type rotating machine, comprising:
    an annular stator having armature windings arranged on an inner periphery of the stator;
    a rotor rotatably arranged inside the stator, the rotor having a rotor core;
    a plurality of permanent magnets disposed in the rotor core so that poles and interpoles are defined alternately in the circumferential direction of the rotor, each of the poles being positioned between a pair of permanent magnets opposing in the circumferential direction of the rotor, and each of the interpoles having a non-magnetic portion interposed between the adjoining poles in the circumferential direction of the rotor; and
    a pair of end plates each having a plurality of projections wherein the non-magnetic portions of the interpoles are constituted by cavities, and the rotor is interposed, at both axial ends thereof, between the pair of end plates while the projections are fitted in the cavities,
    wherein the pair of permanent magnets defining each pole are respectively divided into a plurality of magnet pieces in a direction parallel to the magnetizing direction of the permanent magnets; and
    the divided magnet pieces are embedded in magnet holes formed in the rotor core.

2. A permanent magnet-reluctance type rotating machine, comprising:
    an annular stator having armature windings arranged on an inner periphery of the stator;
    a rotor rotatably arranged inside the stator, the rotor having a rotor core;
    a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor; and a pair of end plates each having a plurality of projections, wherein the non-magnetic portions of the interpoles are constituted by cavities, and the rotor is interposed, at both axial ends thereof, between the pair of end plates while the projections are fitted in the cavities, wherein the pair of permanent magnets defining each pole are respectively divided into a plurality of magnet pieces in a direction perpendicular to the magnetizing direction of the permanent magnets; and the divided magnet pieces are embedded in magnet holes formed in the rotor core.

3. The permanent magnet-reluctance type rotating machine as claimed in claim 1 or 2, wherein the non-magnetic portion of each interpole is filled up with non-magnetic material of light-weight and high-compressive strength.

4. The permanent magnet-reluctance type rotating machine as claimed in claim 1 or 2, further comprising a partition plate provided, on both sides thereof, with a plurality of projections each having a configuration identical to that of each of the cavities, wherein the partition plate is interposed in the rotor core at an intermediate position in the axial direction of the rotor while the projections of the partition plate are fitted into the cavities.

5. The permanent magnet-reluctance type rotating machine as claimed in claim 1 or 2, wherein the permanent magnets are constituted by bond magnets which can stiffen after a lapse of a regular period since the bond magnets have been charged.

6. A permanent magnet-reluctance type rotating machine, comprising:

an annular stator having armature windings arranged on an inner periphery of the stator;

a rotor rotatably arranged inside the stator, the rotor having a rotor core;

a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor;

a pair of end plates between which the rotor core is interposed in the axial direction of the rotor;

a partition plate interposed in the rotor core at an intermediate position in the axial direction of the rotor; and a plurality of reinforcement rods which are arranged so as to penetrate the partition plate and the non-magnetic portion of each interpole in the axial direction of the rotor, wherein the pair of permanent magnets defining each pole are respectively divided into a plurality of magnet pieces in a direction parallel to or perpendicular to the magnetizing direction of the permanent magnets, and the divided magnet pieces are embedded in magnet holes formed in the rotor core.

7. The permanent magnet-reluctance type rotating machine as claimed in claim 6, wherein each of the reinforcement rods is in the form of a hollow pipe made of light-weight and high-strength material.

8. A permanent magnet-reluctance type rotating machine, comprising:

an annular stator having armature windings arranged on an inner periphery of the stator;

a rotor rotatably arranged inside the stator, the rotor having a rotor core;

a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor;

a pair of end plates between which the rotor core is interposed in the axial direction of the rotor;

a partition plate interposed in the rotor core at an intermediate position in the axial direction of the rotor; and a plurality of reinforcement rods which are arranged so as to penetrate the partition plate, the rotor core and the end plates in the axial direction of the rotor, wherein the pair of permanent magnets defining each pole are respectively divided into a plurality of magnet pieces in a direction parallel to or perpendicular to the magnetizing direction of the permanent magnets, and the divided magnet pieces are embedded in magnet holes formed in the rotor core.

9. A permanent magnet-reluctance type rotating machine, comprising an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the pair of permanent magnets defining each pole are respectively divided into a plurality of magnet pieces in a direction parallel to or perpendicular to the magnetizing direction of the permanent magnets, and the divided magnet pieces are embedded in magnet holes formed in the rotor core, wherein the non-magnetic portion of each interpole is constituted by a through-cavity which extends in the axial direction of the rotor and into which a coolant medium is to be supplied.

10. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein a plurality of struts are bridged so as to cross each other in the cavity.

11. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein the strut disposed in the non-magnetic portion is configured so as to occupy an area of 5 to 30% of the non-magnetic portion in cross section.

12. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein the cavity is fan-shaped in cross section, consisting of two intersecting straight sides and one arc side and wherein the strut is arranged so that its one end butts against one of the straight sides in a position of 25 to 45% of the whole radial length of the one of the straight sides, from its radial inner end.

13. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein the strut is arranged so that its inner end butts against the cavity's inner wall adjacent to the permanent magnet, while the outer end butts against the cavity's circumferential wall, and said permanent magnet-reluctance type rotating machine comprises one of:

the permanent magnets made of a rare-earth element, wherein the inner and outer ends of the strut are contoured, on the side of a center axis of the interpole in the circumferential direction of the rotor, so that a portion of the outer end has a radius of curvature of 55 to 65% of a portion of the inner end, and the strut is also profiled, on the opposite side of the center axis of the interpole, so that a portion of the inner end has a radius of curvature of 60 to 70% of a portion of the outer end; and the permanent magnets made of ferrite, wherein the inner and outer ends of the strut are contoured, on the side of the center axis of the interpole, so that the portion of the outer end has a radius of curvature of 15 to 25% of the portion of the inner end, and the strut is also profiled, on the opposite side of the center axis of the interpole, so that the portion of the inner end has a radius of curvature of 45 to 55% of the portion of the outer end.

14. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein the rotor core is formed in a manner that the cross sectional area of a core portion interposed between a center axis of the interpole in the circumferential direction of the rotor and a magnet hole formed in the rotor core for accommodating each permanent magnet therein, is equal to 5 to 20% of the cross sectional area of the magnet hole.

15. The permanent magnet-reluctance type rotating machine as claimed in claim 14, wherein the permanent magnets are accommodated in the magnet holes such that cavities remain in the magnet holes.

16. A permanent magnet-reluctance type rotating machine, comprising:

an annular stator having armature windings arranged on an inner periphery of the stator;

a rotor rotatably arranged inside the stator, the rotor having a rotor core; and a plurality of permanent magnets disposed in the rotor core so that poles and interpoles are defined alternately in the circumferential direction of the rotor, each of the poles being positioned between a pair of permanent magnets opposing in the circumferential direction of the rotor, each of the interpoles having a non-magnetic portion interposed between the adjoining poles in the circumferential direction of the rotor, wherein the non-magnetic portion of each interpole is constituted by a cavity in which at least one strut is disposed so as to butt against the cavity's inner wall adjacent to the permanent magnet, wherein the permanent magnets are accommodated in magnet holes formed in the rotor core, and said permanent magnet-reluctance type rotating machine comprises one of:

the permanent magnets made of a rare-earth element, wherein each of the magnet holes is contoured so that the curvature radius of an outer edge of the magnet hole's inner end on the side of a center axis of the interpole in the circumferential direction of the rotor, the curvature radius of an inner edge of the magnet hole's inner end, and the curvature radius of the magnet hole's outer end on the opposite side of the center axis of the interpole are respectively 55 to 65%, 35 to 45%, and 55 to 65% of the width of the magnet hole in the magnetizing direction; and the permanent magnets made of ferrite, wherein the magnet hole is contoured so that the curvature radius of the outer edge of the magnet hole's inner end on the side of the center axis of the interpole, the curvature radius of the inner edge of the magnet hole's inner end, and the curvature radius of the magnet hole's outer end on the opposite side of the center axis of the interpole are respectively 40 to 50%, 20 to 30%, and 55 to 65% of the width of the magnet hole in the magnetizing direction.

17. A permanent magnet-reluctance type rotating machine, comprising:

a stator having armature windings;

a rotor having a rotor core;

a plurality of permanent magnets accommodated in magnet holes formed in the rotor core, for negating the armature windings' flux passing between adjoining poles defined in the rotor;

non-magnetic portions defined in the rotor on the outer circumferential side of the permanent magnets, thereby forming a magnetic unevenness in the circumferential direction of the rotor; and a plurality of rods of circular cross sections made of light-weight and high-strength non-magnetic material, wherein each of the permanent magnets and each of the magnet holes are both arched to have U-shaped configurations, wherein the permanent magnets are accommodated in the magnet holes while remaining such that cavities remain in the magnet holes, wherein the rods are inserted into the cavities remaining in the magnet holes, respectively.

18. The permanent magnet-reluctance type rotating machine as claimed in claim 17, wherein the rods are in the form of pipes.

19. The permanent magnet-reluctance type rotating machine as claimed in claim 17, further comprising a plurality of plates made of non-magnetic and non-conductive material:

wherein each of the plates is interposed between each of the rods and the permanent magnet.

20. The permanent magnet-reluctance type rotating machine as claimed in claim 17, wherein each of the plates is interposed between each of the rods and the permanent magnet inadhesively.

21. A permanent magnet-reluctance type rotating machine, comprising:

a stator having armature windings;

a rotor having a rotor core;

a plurality of permanent magnets accommodated in magnet holes formed in the rotor core, for negating the armature windings' flux passing between adjoining poles defined in the rotor;

non-magnetic portions defined in the rotor on the outer circumferential side of the permanent magnets, thereby forming a magnetic unevenness in the circumferential direction of the rotor; and a plurality of rods of polygonal cross sections made of light-weight and high-strength non-magnetic material, wherein each of the permanent magnets and each of the magnet holes are both arched to have U-shaped configurations, wherein the permanent magnets are accommodated in the magnet holes while remaining such that cavities remain in the magnet holes, wherein the rods are inserted into the cavities remaining in the magnet holes so as to each contact with each of the cavities through at least three corners of the polygonal rod.

22. The permanent magnet-reluctance type rotating machine as claimed in any one of claims 15, 17 or 21, wherein the cavities are filled up with light-weight and high-strength non-magnetic material.

23. The permanent magnet-reluctance type rotating machine as claimed in any one of claims 15, 17 or 21, wherein the cavities are filled up with bond-type fillers which solidify as time passes.

24. The permanent magnet-reluctance type rotating machine as claimed in any one of claims 15, 17 or 21, wherein the cavities are filled up with fillers made of foaming resin which solidifies as time passes.

25. The permanent magnet-reluctance type rotating machine as claimed in any one of claims 14, 16, 17 or 21, wherein the magnet holes and the permanent magnets accommodated therein are shaped to have tapered configurations.

26. The permanent magnet-reluctance type rotating machine as claimed in claim 25, wherein each of the permanent magnets accommodated in the magnet holes is coated with material in the form of a film.

* * * * *